US008635838B2

(12) United States Patent
Dunn et al.

(10) Patent No.: US 8,635,838 B2
(45) Date of Patent: Jan. 28, 2014

(54) SYSTEM FOR DISPOSING WASTE PACKAGES SUCH AS DIAPERS

(75) Inventors: Steven B. Dunn, Beverly Hills, PA (US); Mark A. Hatherill, Beverly Hills, CA (US); Kevin D. Johnson, Tarzana, CA (US)

(73) Assignee: Munchkin, Inc., Van Nuys, CA (US)

( * ) Notice: Subject to any disclaimer, the term of this patent is extended or adjusted under 35 U.S.C. 154(b) by 1010 days.

(21) Appl. No.: 12/609,771

(22) Filed: Oct. 30, 2009

(65) Prior Publication Data

US 2011/0100995 A1 May 5, 2011

(51) Int. Cl.
*B65F 1/06* (2006.01)
*B65B 7/12* (2006.01)
*B65B 67/12* (2006.01)

(52) U.S. Cl.
CPC ........... *B65F 1/06* (2013.01); *B65F 2210/1675* (2013.01); *B65F 2240/132* (2013.01); *B65B 7/12* (2013.01); *B65B 67/125* (2013.01); *Y10S 220/9081* (2013.01)
USPC ....... 53/284.7; 53/370; 220/229; 220/495.06; 220/908.1

(58) Field of Classification Search
CPC .... B65B 67/1244; B65B 67/125; B65B 7/12; B65F 2210/1675; B65F 2240/132; B65F 1/002; B65F 1/06
USPC ............ 53/570, 284.7, 370; 220/229, 495.06, 220/908.1
IPC ........................................ B65B 7/12; B65F 1/06
See application file for complete search history.

(56) References Cited

U.S. PATENT DOCUMENTS

| 1,633 | A | 6/1840 | Sellers et al. |
| 18,046 | A | 8/1857 | Hinckley |

(Continued)

FOREIGN PATENT DOCUMENTS

| DE | 202005015117 | 3/2007 |
| EP | 0913344 | 5/1999 |

(Continued)

OTHER PUBLICATIONS

Copending U.S. Appl. No. 12/172,715, filed Jul. 14, 2008 entitled "Waste Disposal Devices".

(Continued)

*Primary Examiner* — Stephen F Gerrity
(74) *Attorney, Agent, or Firm* — Robert Z. Evora, Esq.

(57) ABSTRACT

Systems and methods for facilitating hygienic storage and disposal of waste packages such as used disposable diapers include a housing, a lid, and a bag unit having a bag frame and an attached single use flexible bag. The flexible bag is pleated and larger in cross-section at a lower portion than it is at the connection to the bag frame. The bag frame is releasably mounted to the housing so that it will not rotate. The lower portion of the flexible bag is positioned in a storage chamber of the housing that is shaped so as to align and center the bag. A rotatable member having radially extending flexible fingers is engaged with an intermediate portion of the bag. When the lid is closed, the rotatable member will twist the intermediate portion of the bag, sealing odors in the lower portion of the bag. A parent or caregiver will push the waste package through the resistance of the twisted intermediate portion into the lower portion of the bag, and close the lid to re-seal the twisted portion.

13 Claims, 22 Drawing Sheets

(56) References Cited

U.S. PATENT DOCUMENTS

| | | | |
|---|---|---|---|
| 111,521 A | 2/1871 | Dodge | |
| 293,459 A | 2/1884 | Hawn | |
| 428,228 A | 5/1890 | Price | |
| 459,875 A | 9/1891 | Locke | |
| 471,433 A | 3/1892 | Rice | |
| 503,113 A | 8/1893 | Osterloh | |
| 627,434 A | 6/1899 | Miller | |
| 685,179 A | 10/1901 | Seebers | |
| 859,497 A | 7/1907 | Hood | |
| 860,183 A | 7/1907 | Barr | |
| 1,719,185 A | 7/1929 | Lowy | |
| 2,271,918 A | 2/1942 | Glowka | |
| 2,352,503 A | 6/1944 | Walton | |
| 2,610,432 A | 9/1952 | Ambrose | |
| 3,086,674 A | 4/1963 | Scheuerman | |
| 3,214,065 A | 10/1965 | Thornton | |
| 3,310,224 A | 3/1967 | Laguerre | |
| 3,321,103 A * | 5/1967 | Phillips | 220/495.06 |
| 3,322,477 A * | 5/1967 | Armijo | 53/570 |
| 3,478,922 A | 11/1969 | Mole | |
| 3,536,192 A | 10/1970 | Couper | |
| 3,619,822 A | 11/1971 | Carmichael | |
| 3,772,712 A | 11/1973 | Renn et al. | |
| 3,779,157 A | 12/1973 | Ross, Jr. et al. | |
| 3,908,336 A | 9/1975 | Forslund | |
| 3,959,947 A | 6/1976 | Sonnino | |
| 4,162,602 A | 7/1979 | Achelpohl et al. | |
| 4,175,603 A | 11/1979 | Iaboni et al. | |
| 4,303,710 A | 12/1981 | Bullard et al. | |
| 4,316,762 A | 2/1982 | Martin | |
| 4,331,254 A * | 5/1982 | Haggerty | 220/229 |
| 4,349,123 A | 9/1982 | Yang | |
| 4,427,110 A | 1/1984 | Shaw, Jr. | |
| 4,437,575 A | 3/1984 | Hahn | |
| D274,462 S | 6/1984 | Rakocy et al. | |
| 4,561,563 A | 12/1985 | Woods | |
| 4,600,112 A * | 7/1986 | Shillington et al. | 220/229 |
| 4,617,230 A | 10/1986 | Shah et al. | |
| 4,637,061 A | 1/1987 | Riese | |
| 4,687,711 A | 8/1987 | Vietto et al. | |
| 4,724,185 A | 2/1988 | Shah | |
| 4,760,784 A | 8/1988 | Whiteside | |
| 4,868,024 A | 9/1989 | Cross et al. | |
| 4,869,049 A | 9/1989 | Richards et al. | |
| 4,880,852 A | 11/1989 | Hoshino et al. | |
| 4,890,934 A | 1/1990 | Feaver et al. | |
| 4,906,495 A | 3/1990 | Martini et al. | |
| 4,934,529 A | 6/1990 | Richards et al. | |
| 4,946,720 A | 8/1990 | Oishi et al. | |
| 4,948,266 A | 8/1990 | Bencic | |
| 4,948,639 A | 8/1990 | Brooker et al. | |
| 4,983,171 A | 1/1991 | Schirmer | |
| 4,996,727 A | 3/1991 | Wyatt | |
| 5,022,553 A | 6/1991 | Pontius | |
| 5,024,327 A * | 6/1991 | Shillington | 220/229 |
| 5,056,293 A | 10/1991 | Richards et al. | |
| 5,116,139 A | 5/1992 | Young et al. | |
| 5,120,454 A | 6/1992 | Wieties | |
| 5,125,526 A | 6/1992 | Sumanis | |
| 5,129,735 A | 7/1992 | Neal et al. | |
| 5,147,055 A | 9/1992 | Samson et al. | |
| 5,158,199 A | 10/1992 | Pontius | |
| 5,174,462 A | 12/1992 | Hames | |
| 5,183,157 A | 2/1993 | Darden | |
| 5,184,575 A | 2/1993 | Reinartz | |
| D334,975 S | 4/1993 | Bunce et al. | |
| 5,222,620 A | 6/1993 | Lima et al. | |
| 5,278,282 A | 1/1994 | Nauman et al. | |
| 5,294,017 A | 3/1994 | Li | |
| 5,370,940 A | 12/1994 | Hazlitt et al. | |
| 5,382,631 A | 1/1995 | Stehling et al. | |
| 5,385,259 A | 1/1995 | Bernstein et al. | |
| 5,391,423 A | 2/1995 | Wnuk et al. | |
| 5,405,041 A | 4/1995 | Van Brackle | |
| 5,520,303 A | 5/1996 | Bernstein et al. | |
| 5,535,913 A | 7/1996 | Asbach et al. | |
| 5,582,820 A | 12/1996 | Yamamoto et al. | |
| 5,590,512 A | 1/1997 | Richards et al. | |
| 5,637,366 A | 6/1997 | Davis et al. | |
| D380,538 S | 7/1997 | Muller et al. | |
| 5,642,810 A | 7/1997 | Warner et al. | |
| 5,651,231 A | 7/1997 | Garland | |
| 5,655,680 A | 8/1997 | Asbach et al. | |
| D383,864 S | 9/1997 | Billings | |
| 5,671,847 A | 9/1997 | Pederson et al. | |
| 5,692,837 A | 12/1997 | Beer | |
| 5,752,658 A | 5/1998 | Gibbs et al. | |
| 5,759,648 A | 6/1998 | Idlas | |
| 5,762,421 A | 6/1998 | Ross | |
| 5,765,339 A | 6/1998 | Garland | |
| 5,799,909 A | 9/1998 | Ziegler | |
| 5,813,200 A | 9/1998 | Jacoby et al. | |
| 5,852,114 A | 12/1998 | Loomis et al. | |
| 5,884,556 A | 3/1999 | Klepacki et al. | |
| 5,886,078 A | 3/1999 | Sullivan et al. | |
| 5,897,084 A | 4/1999 | Judge | |
| 5,962,598 A | 10/1999 | Mack et al. | |
| 5,988,520 A | 11/1999 | Bitner | |
| 6,000,323 A | 12/1999 | Schlegel | |
| 6,007,030 A | 12/1999 | Judge | |
| D424,677 S | 5/2000 | Chen | |
| 6,065,272 A | 5/2000 | Lecomte | |
| 6,071,451 A | 6/2000 | Wang et al. | |
| 6,096,420 A | 8/2000 | Wilhoit et al. | |
| 6,116,780 A | 9/2000 | Young et al. | |
| 6,120,743 A | 9/2000 | Papari | |
| D432,224 S | 10/2000 | Hautmann et al. | |
| 6,128,890 A | 10/2000 | Firth | |
| 6,129,716 A | 10/2000 | Steer | |
| 6,141,945 A | 11/2000 | Becher | |
| 6,147,167 A | 11/2000 | Mack et al. | |
| 6,164,442 A | 12/2000 | Stravitz | |
| 6,164,821 A | 12/2000 | Randall | |
| 6,170,240 B1 | 1/2001 | Jacoby et al. | |
| 6,173,851 B1 * | 1/2001 | Hague et al. | 220/229 |
| 6,174,990 B1 | 1/2001 | Noda | |
| 6,199,220 B1 | 3/2001 | Smith | |
| 6,202,877 B1 | 3/2001 | La Torre et al. | |
| 6,258,423 B1 | 7/2001 | Giori | |
| 6,296,388 B1 | 10/2001 | Galomb et al. | |
| 6,303,220 B1 | 10/2001 | Minamoto et al. | |
| 6,316,067 B1 | 11/2001 | Edwards et al. | |
| 6,345,911 B1 | 2/2002 | Young et al. | |
| 6,354,062 B1 | 3/2002 | Haughton et al. | |
| D455,485 S | 4/2002 | Hensel | |
| 6,370,847 B1 | 4/2002 | Jensen et al. | |
| D458,359 S | 6/2002 | Blanchette | |
| 6,453,640 B1 | 9/2002 | Hayashi | |
| 6,494,619 B1 | 12/2002 | Sulpizio | |
| 6,516,588 B2 | 2/2003 | Jensen et al. | |
| 6,532,605 B1 | 3/2003 | Howell | |
| 6,540,103 B2 | 4/2003 | Silvers | |
| D475,444 S | 6/2003 | Laferriere et al. | |
| 6,585,153 B2 | 7/2003 | Ryan | |
| 6,596,814 B2 | 7/2003 | Kim et al. | |
| 6,612,099 B2 | 9/2003 | Stravitz | |
| D482,109 S | 11/2003 | Woods | |
| D482,110 S | 11/2003 | Laferriere et al. | |
| D482,111 S | 11/2003 | Laferriere et al. | |
| 6,656,514 B1 | 12/2003 | Tubbs | |
| 6,719,194 B2 | 4/2004 | Richards | |
| 6,722,107 B2 | 4/2004 | Morand | |
| D491,257 S | 6/2004 | Picken, Jr. | |
| D492,018 S | 6/2004 | Schroder | |
| 6,804,930 B2 | 10/2004 | Stravitz | |
| 6,817,164 B2 | 11/2004 | Maufette et al. | |
| D500,590 S | 1/2005 | Sachen | |
| D501,602 S | 2/2005 | Karlsson et al. | |
| 6,851,251 B2 | 2/2005 | Stravitz | |
| 6,894,085 B2 | 5/2005 | Beaverson et al. | |
| 6,901,974 B2 | 6/2005 | Chomik et al. | |
| 6,914,091 B2 | 7/2005 | Donald et al. | |
| 6,921,581 B2 | 7/2005 | Van Gelder et al. | |
| 6,925,781 B1 | 8/2005 | Knuth et al. | |

(56) References Cited

U.S. PATENT DOCUMENTS

| | | | |
|---|---|---|---|
| 6,931,684 B1 | 8/2005 | Henegar | |
| 6,941,733 B2 | 9/2005 | Chomik et al. | |
| 6,956,088 B2 | 10/2005 | Farley et al. | |
| 6,974,029 B2 | 12/2005 | Morand et al. | |
| D515,683 S | 2/2006 | LaBlaine | |
| 6,993,891 B2 | 2/2006 | Richardson et al. | |
| 6,994,247 B2 | 2/2006 | Richards | |
| D517,673 S | 3/2006 | Yamamoto et al. | |
| D523,632 S | 6/2006 | Handley | |
| 7,073,311 B2 | 7/2006 | Chomik et al. | |
| 7,086,569 B2 | 8/2006 | Stravitz | |
| 7,100,767 B2 | 9/2006 | Chomik et al. | |
| 7,114,314 B2 | 10/2006 | Stravitz | |
| 7,114,534 B2 | 10/2006 | Chomik et al. | |
| 7,146,785 B2 | 12/2006 | Stravitz | |
| 7,168,591 B1 | 1/2007 | Miller | |
| 7,175,918 B2 | 2/2007 | Saraf et al. | |
| 7,178,314 B2 | 2/2007 | Chomik et al. | |
| 7,241,493 B2 | 7/2007 | Zhou | |
| D550,345 S | 9/2007 | Weggelaar | |
| D551,333 S | 9/2007 | Wu | |
| 7,279,198 B1 | 10/2007 | Knauf | |
| 7,288,593 B2 | 10/2007 | Yang et al. | |
| 7,300,207 B2 | 11/2007 | Linneweil | |
| 7,303,075 B2 | 12/2007 | Herbert et al. | |
| 7,316,100 B2 | 1/2008 | Stravitz et al. | |
| 7,328,547 B2 | 2/2008 | Mehta et al. | |
| 7,347,624 B2 | 3/2008 | Savicki, Sr. et al. | |
| D565,715 S | 4/2008 | Wu | |
| 7,350,663 B2 | 4/2008 | Chomik et al. | |
| 7,377,203 B2 | 5/2008 | Chomik | |
| 7,434,377 B2 | 10/2008 | Stravitz et al. | |
| 7,459,191 B2 | 12/2008 | Sleight et al. | |
| D585,129 S | 1/2009 | Huang | |
| 7,490,734 B2 | 2/2009 | Carr | |
| 7,500,339 B2 | 3/2009 | Knuth et al. | |
| 7,503,152 B2 | 3/2009 | Stravitz et al. | |
| 7,503,159 B2 | 3/2009 | Stravitz et al. | |
| D591,415 S | 4/2009 | Wu | |
| D591,509 S | 5/2009 | Lown et al. | |
| 7,607,911 B2 | 10/2009 | Sperry et al. | |
| 7,629,036 B2 | 12/2009 | Chomik et al. | |
| D609,008 S | 2/2010 | Diamant | |
| 7,712,285 B2 | 5/2010 | Stravitz et al. | |
| D639,004 S | 5/2011 | Dunn et al. | |
| 7,958,704 B2 * | 6/2011 | Stravitz et al. | 220/908.1 |
| 7,963,414 B1 | 6/2011 | Stravitz et al. | |
| 8,091,325 B2 * | 1/2012 | Stravitz et al. | 53/370 |
| 8,127,519 B2 * | 3/2012 | Stravitz | 53/483 |
| 8,215,089 B2 * | 7/2012 | Stravitz | 53/370 |
| 8,235,237 B1 * | 8/2012 | Stravitz | 220/908.1 |
| 2001/0037627 A1 | 11/2001 | Hausslein | |
| 2002/0162304 A1 | 11/2002 | Stravitz | |
| 2003/0078552 A1 | 4/2003 | Tepper et al. | |
| 2003/0190097 A1 | 10/2003 | Hajianpour | |
| 2004/0020175 A1 * | 2/2004 | Stravitz | 53/370 |
| 2004/0083681 A1 | 5/2004 | Stravitz | |
| 2004/0191438 A1 | 9/2004 | Cosentino et al. | |
| 2005/0033259 A1 | 2/2005 | Stravitz | |
| 2005/0044819 A1 | 3/2005 | Chomik et al. | |
| 2005/0079372 A1 | 4/2005 | Schmal et al. | |
| 2005/0131368 A2 | 6/2005 | Snell | |
| 2005/0183400 A1 | 8/2005 | Stravitz et al. | |
| 2005/0188661 A1 | 9/2005 | Stravitz et al. | |
| 2005/0193691 A1 | 9/2005 | Stravitz et al. | |
| 2005/0193692 A1 | 9/2005 | Stravitz et al. | |
| 2005/0217214 A1 | 10/2005 | Richardson et al. | |
| 2005/0228354 A1 | 10/2005 | Scholer | |
| 2005/0274093 A1 | 12/2005 | Stravitz et al. | |
| 2006/0013512 A1 | 1/2006 | Shaw | |
| 2006/0021301 A1 | 2/2006 | Stravitz et al. | |
| 2006/0130438 A1 | 6/2006 | Stravitz et al. | |
| 2006/0130439 A1 | 6/2006 | Stravitz et al. | |
| 2006/0237461 A1 | 10/2006 | Chomik et al. | |
| 2006/0249418 A1 | 11/2006 | Chomik et al. | |
| 2006/0251842 A1 | 11/2006 | Chomik et al. | |
| 2007/0045324 A1 | 3/2007 | Mitchell et al. | |
| 2007/0053616 A1 | 3/2007 | Plouff | |
| 2007/0157581 A1 | 7/2007 | Webb et al. | |
| 2007/0175182 A1 | 8/2007 | Stravitz et al. | |
| 2007/0180798 A1 | 8/2007 | Stravitz et al. | |
| 2007/0189643 A1 | 8/2007 | Tresenfeld | |
| 2007/0246465 A1 | 10/2007 | Stravitz et al. | |
| 2008/0019618 A1 | 1/2008 | Dayton et al. | |
| 2008/0078762 A1 * | 4/2008 | Iyer | 220/229 |
| 2008/0134644 A1 | 6/2008 | Knuth et al. | |
| 2008/0179330 A1 | 7/2008 | Brooks et al. | |
| 2008/0199643 A1 | 8/2008 | Withers | |
| 2008/0247679 A1 | 10/2008 | Dayton et al. | |
| 2008/0310772 A1 | 12/2008 | Dayton et al. | |
| 2009/0065521 A1 | 3/2009 | Amundson et al. | |
| 2010/0005759 A1 * | 1/2010 | Stravitz | 53/118 |
| 2010/0005762 A1 * | 1/2010 | Stravitz | 53/567 |
| 2010/0006712 A1 * | 1/2010 | Stravitz | 248/99 |

FOREIGN PATENT DOCUMENTS

| | | | |
|---|---|---|---|
| GB | 399031 | 9/1933 | |
| GB | 772538 | 4/1957 | |
| GB | 2206094 | 12/1988 | |
| JP | 2002226003 A * | 8/2002 | B65F 1/06 |
| JP | 2004-175508 | 6/2004 | |
| JP | 3134078 | 8/2007 | |
| WO | 99/39675 A1 | 8/1999 | |
| WO | 02/42364 A2 | 5/2002 | |
| WO | 02/051788 A1 | 7/2002 | |
| WO | 2005-042381 | 5/2005 | |
| WO | 2005/042381 | 5/2005 | |
| WO | 2007-130889 | 11/2007 | |
| WO | 2007/130889 A2 | 11/2007 | |
| WO | 2008/059282 | 5/2008 | |

OTHER PUBLICATIONS

Copending U.S. Appl. No. 12/172,758, filed Jul. 14, 2008 entitled "Tubing Assembly for Waste Disposal Devices".

Copending U.S. Appl. No. 12/172,793, filed Jul. 14, 2008 entitled "Waste Disposal Devices".

* cited by examiner

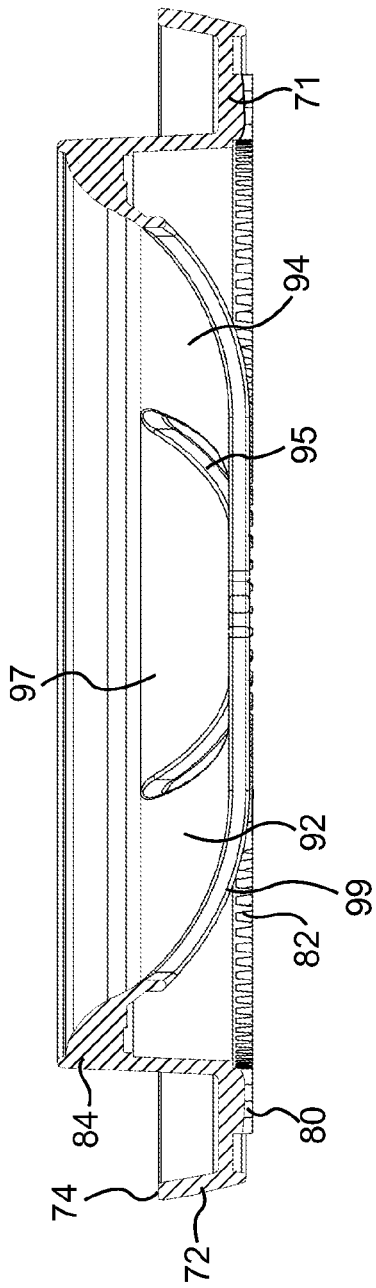
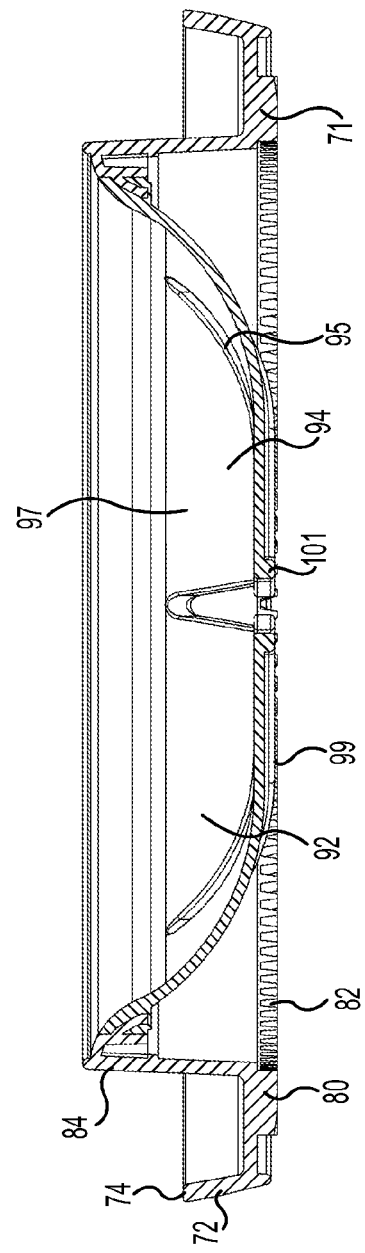
FIG. 18
FIG. 19

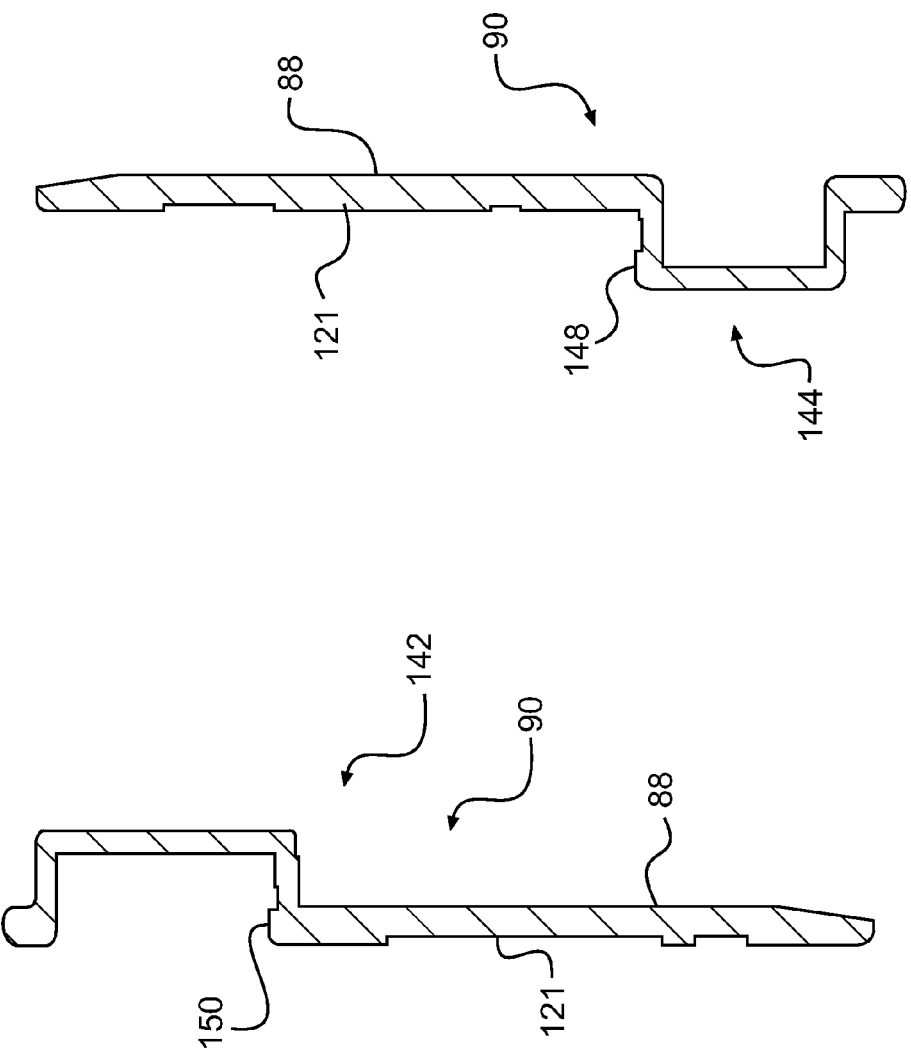

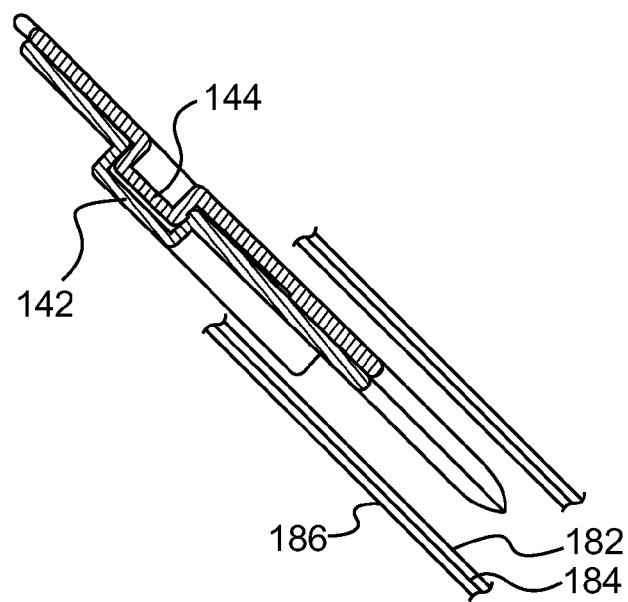
FIG. 28
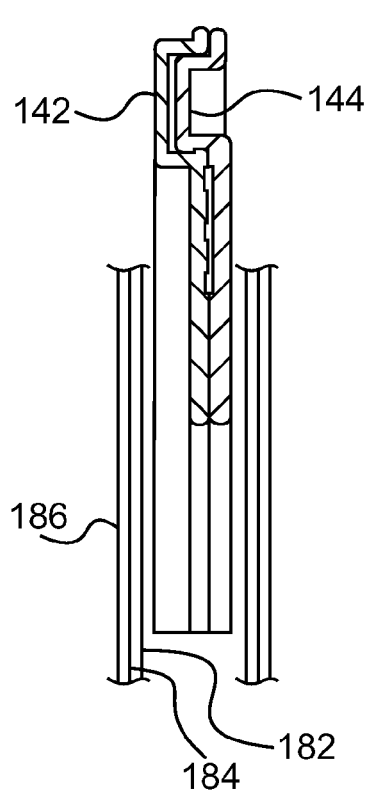 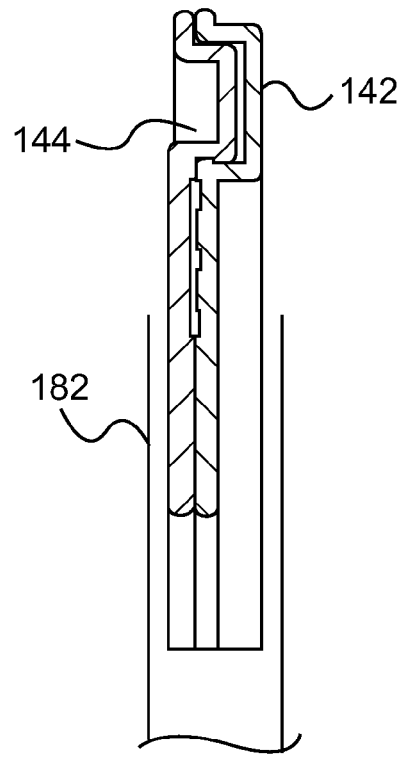
FIG. 29          FIG. 30

SYSTEM FOR DISPOSING WASTE PACKAGES SUCH AS DIAPERS

BACKGROUND OF THE INVENTION

1. Field of the Invention

This invention relates broadly to the field of household and institutional waste disposal systems and processes, and more specifically to diaper pail systems and methods for hygienically holding and packaging particularly unsanitary and odiferous waste, such as used diapers, for eventual disposal.

2. Description of the Related Technology

Since the introduction of disposable diapers several decades ago, parents and caregivers have struggled with the problem of how to hold unsanitary, odiferous waste packages such as used disposable diapers and wipes within an infant's changing room for eventual final disposal with a waste management service. Institutions such as hospitals and day care centers have faced a similar problem.

Holding such waste packages in ordinary trash cans is problematic, even when a lid is used, because a substantial amount of odor can and will escape into the surrounding room when the lid is removed, and again when the lid is replaced. In order to address this problem, diaper disposal systems have been developed that are designed to encase the waste package within a plastic barrier material.

One such system has been marketed under the trademark DIAPER GENIE®. The original DIAPER GENIE® system uses a long, continuous length of plastic tubing that is dispensed from an annular space within a tube-holding cartridge that has a central opening. The consumer prepares the system for use by closing one end of the tubing with a knot and pushing the knotted end through the central opening. He or she then inserts a waste package through the central opening, and the cartridge is rotated in order to create a twist seal in the tubing above the waste package. Additional tubing is dispensed as the cartridge is rotated. The process may be repeated until the storage compartment in the container is full. When this occurs, the consumer must physically cut the upper end of the tube and tie another knot at the open end of the tube. Such systems yield an awkward chain of individual waste packets within compartments that are defined in the long tube by a multiplicity of twisted portions.

Such a system can be relatively complicated for the uninitiated, requiring the parent or caregiver to tie knots at both ends of the tube and to thread the tube through the central hole when installing a tubing cartridge. While this may not be a problem for an experienced individual, it could cause problems for an inexperienced caregiver, such as a young babysitter or grandparent. Using such a system could also be problematic for a disabled individual, especially a person who has vision problems or who lacks manual dexterity. Removing the long chain of waste packages from the storage space of such a device can also be cumbersome. Such systems are also uneconomical due to the amount of plastic tubing material used per waste package.

Another version of the DIAPER GENIE® system also requires the parent or caregiver to pull a measured length of plastic tubing out of a cassette and to tie a knot at the end of the tubing. The knotted portion must then be pushed downwardly through a pair of spring-loaded jaws into a lower portion of the unit. The parent or caregiver will then insert used disposable diapers that have been tightly rolled through a central opening in the cartridge downwardly into the knotted tube through a portion of the tube that is clamped by the spring-loaded jaws. When the lower portion of the tube is full of used diapers, the parent or caregiver will use an integrated cutter mechanism to cut the upper portion of the tube and close it with a knot. The tube having knots at both ends is then pulled out of the unit and thrown away.

Unfortunately, the pressure that is created by the spring-loaded jaws in the second version of the DIAPER GENIE® system does not always form an effective odor seal. When a diaper is being pushed downwardly against the bias of the jaws, the jaws are forced open, causing open communication between the odiferous air in the lower portion of the tube and the surrounding room. Accordingly, when a new waste package is being placed in the tube, the parent or caregiver can be exposed to a noticeable amount of odor. Inserting a waste package into such a system can also be an uncomfortable experience for a parent or caregiver, because his or her hand may become temporarily trapped between the spring-loaded jaws.

In both versions of the DIAPER GENIE® system, both ends of the tubing are tied with a knot rather than sealed, which under certain circumstances can lead to leakage of liquid waste onto the floor or carpet, the unit or the clothing of a parent or caregiver.

Another type of waste disposal system has been invented by Mr. David Stravitz and is disclosed in U.S. Pat. Nos. 6,612,099, 6,804,930, 6,851,251, 7,114,314, and 7,146,785. These systems may include a container that defines a waste receiving chamber, an insert defining a cavity for receiving a pack of flexible tubing and an inner lid that is connected to the container for covering or exposing an open top of the insert. The inner lid and the insert define a dispensing opening through which the tubing passes during use of the waste disposal system. An outer lid, which is optionally pivotally connected to the container, is movable between a position in which the waste receiving chamber is accessible and a position in which the waste receiving chamber is covered. A retention mechanism holds the waste package while a rotation mechanism causes rotation of the retention mechanism relative to the insert to cause a twist to be formed above a waste package when held by the retention mechanism. This encapsulates the waste package in the tubing.

Mr. Stravitz has more recently invented new diaper disposal systems in which a single use diaper pail bag has an upper end that is fixed between two different portions of a rigid frame that is mounted so as to be rotationally fixed with respect to the housing of the unit. In these systems, which are described in pending U.S. patent application Ser. Nos. 12/172,175, 12/172,758 and 12/172,793, a rotatable member having a plurality of resilient, inwardly directed fingers is used to engage an intermediate portion of the single use bag in order to create a twist between upper and lower portions of the bag in order to form an odor seal. While certain principles within this system are believed to have considerable promise, there has been a need for additional innovation in order to provide a diaper disposal system of commercial quality that has the convenience, functionality and durability to be the best diaper disposal system ever developed.

A need has existed for an improved diaper disposal system that is more convenient to load and to use, that utilizes space in a more efficient manner and that reduces the potential for odor and liquid leakage in comparison to conventional commercial diaper disposal systems.

SUMMARY OF THE INVENTION

Accordingly, it is an object of the invention to provide an improved diaper disposal system that is more convenient to load and to use, that utilizes space in a more efficient manner and that reduces the potential for odor and liquid leakage in comparison to conventional commercial diaper disposal systems.

In order to achieve the above and other objects of the invention, a diaper pail assembly according to a first aspect of the invention includes a housing, the housing having a plurality of recesses; a bag unit having a bag frame and a flexible bag, the bag frame being releasably mounted to the housing so as to be prevented from rotating with respect to the housing, wherein the bag frame has a plurality of tabs that are respectively positioned within the plurality of recesses.

A diaper pail assembly according to a second aspect of the invention includes a housing, the housing having at least one recess; a bag unit having a bag frame and a flexible bag, the bag frame being releasably mounted to the housing so as to be prevented from rotating with respect to the housing, wherein the bag frame has at least one tab that is positioned within the recess; and wherein the housing further comprises a locking mechanism for releasably locking the tab within said recess.

According to another aspect of the invention, a diaper pail assembly includes a housing; a bag unit having a bag frame and a flexible bag, the bag frame having a lower surface and being releasably mounted to the housing so as not to rotate with respect to the housing; and wherein the housing is constructed and arranged to permit a user to lift the bag frame from said housing by contacting the lower surface.

A diaper pail assembly according to another aspect of the invention includes a housing; a flexible bag releasably mounted to the housing so as not to rotate with respect to the housing; and a rotatable member for twisting a portion of the bag, the rotatable member comprising a plurality of flexible, inwardly extending fingers, and wherein a bag contact portion of the fingers has a kinetic frictional coefficient with respect to like material that is substantially within a range of about 0.37 to about 0.67.

A diaper pail assembly according to another aspect of the invention includes a housing; a flexible bag releasably mounted to the housing so as not to rotate with respect to the housing; and a rotatable member for twisting a portion of the bag, the rotatable member comprising a plurality of inwardly extending fingers that are fabricated from an elastomeric material, and wherein said elastomeric material has a hardness that is within a range of about 60 Shore A to about 120 Shore A.

A diaper pail assembly according to another aspect of the invention includes a housing; a flexible bag releasably mounted to the housing so as not to rotate with respect to the housing, the external surface of the flexible bag having a kinetic frictional coefficient with respect to like material that is within a range of about 0.12 to about 0.47; and a rotatable member for twisting a portion of the bag, the rotatable member comprising a plurality of inwardly extending fingers having a bag contact surface.

A diaper pail assembly according to another aspect of the invention includes a housing; a bag releasably mounted to the housing so as not to rotate with respect to the housing; and a rotatable member for twisting a portion of the bag, the rotatable member comprising a plurality of flexible, inwardly extending fingers and a corresponding plurality of spaces defined between the fingers, and wherein at least one of the spaces has a first width at a first location and a second width at a second location, and wherein the first width is greater than the second width.

A diaper pail assembly according to another aspect of the invention includes a housing; a bag releasably mounted to the housing so as not to rotate with respect to the housing; and a rotatable member for twisting a portion of the bag, the rotatable member comprising a plurality of flexible, inwardly extending fingers, the fingers being constructed and arranged to define a central opening having a minimum diameter when the fingers are in an unstressed position, and wherein the minimum diameter is within a range of about 3 mm to about 13 mm.

A diaper pail assembly according to another aspect of the invention includes a housing; a bag having a bag frame, the bag frame being releasably mounted to said housing so as not to rotate with respect to the housing; a rotatable member for twisting a portion of the bag, and wherein the rotatable member comprises a support member for supporting the bag frame.

A diaper pail assembly according to another aspect of the invention includes a housing; a bag holder for holding a bag; a bottom surface for supporting the bag, wherein said bottom surface comprises a curved concave portion for aligning and centering the bag.

A diaper pail assembly according to another aspect of the invention includes a housing; a lid mounted to the housing; a bag; a rotatable member for effecting twisting of the flexible bag; and a transmission mechanism for rotating the rotating member when the lid is closed, and wherein the transmission member includes a clutch mechanism that is constructed and arranged to disengage when a predetermined amount of force within said transmission mechanism is exceeded.

A diaper pail bag according to another aspect of the invention includes a flexible bag; a frame attached to the flexible bag, the frame having a hinge defined therein; and a reinforcing element for strengthening the attachment between the flexible bag and the frame at a location proximate to the hinge.

A diaper pail bag according to another aspect of the invention includes a flexible bag; a frame attached to the flexible bag, the frame having a hinge defined therein; wherein the frame has a lower surface, and wherein the flexible bag is bonded to the lower surface.

A diaper pail bag according to another aspect of the invention includes a flexible bag, at least a portion of the flexible bag being pleated; and a frame attached to the flexible bag.

A diaper pail bag according to another aspect of the invention includes a flexible bag; and a frame attached to the flexible bag, the frame having a hinge defined therein permitting the frame to be moved between open and closed positions, and a plurality of outwardly extending registration projections.

A method of storing used diapers for disposal according to another aspect of the invention includes steps of installing a pleated flexible bag having a first diameter at a first upper portion and a second diameter that is greater than the first diameter at a second lower portion into a diaper disposal system so that said second, lower portion of said pleated flexible bag is located within a storage space of the diaper disposal system; placing at least one used diaper within the pleated flexible bag; and removing the pleated flexible bag from the diaper disposal system.

A method of opening a diaper pail bag assembly according to another aspect of the invention includes steps of providing a diaper pail bag assembly including a flexible bag portion and a hinged frame portion that is attached to the flexible bag portion, the step of providing a diaper pail bag assembly being performed by providing the diaper pail bag assembly with the hinged frame portion being in a closed, folded position; and manipulating at least two tab members that are integral with the hinged frame portion in order to move the hinged frame portion out of the closed position.

A method of using a diaper pail assembly according to another aspect of the invention includes steps of mounting an upper portion of a flexible bag to an upper portion of a diaper bag assembly; and pushing a lower portion of the flexible bag downwardly through a resilient rotatable sealing and gripping member having a bag engaging surface that has a kinetic frictional coefficient with respect to an outer surface of the flexible bag that is substantially within a range of about 0.37 to about 0.67.

A method of using a diaper pail assembly according to another aspect of the invention includes steps of installing a flexible bag into a diaper pail assembly, the flexible bag having an inner surface that has a kinetic frictional coefficient with respect to like material that is substantially within a range of about 0.08 to about 0.38; inserting a waste package into the flexible bag; and removing the flexible bag from the diaper pail assembly.

A method of using a diaper pail assembly according to a another aspect of the invention includes providing a bag assembly having a bag frame and an attached flexible bag, the bag frame having a central opening, the central opening having a minimum lateral dimension that is substantially within a range of about 60 mm to about 180 mm; installing the bag assembly into a diaper pail assembly; inserting a waste package into the flexible bag; and removing the bag assembly from the diaper pail assembly.

A method of using a diaper pail assembly according to another aspect of the invention includes providing a bag assembly having a bag frame that is foldable about a hinge and that has a central opening, the bag assembly further including a flexible bag that is attached to the bag frame; installing the bag assembly into a diaper pail assembly; inserting a waste package into the flexible bag; and removing the bag assembly from the diaper pail assembly, the step of removing the bag assembly from the diaper pail assembly including a step of folding the bag frame about the hinge in order to form a carrying handle for the bag assembly.

A method of using a diaper pail assembly according to another aspect of the invention includes installing a flexible bag into a diaper pail assembly, the flexible bag having an outer surface and an inner surface; engaging the outer surface of the flexible bag to create a twist in the flexible bag; dispensing a powder material into an upper portion of the flexible bag above the twist; and inserting a waste package into the flexible bag by pushing the waste package downwardly through the twist, whereby a portion of the powder material is pushed with the waste package through the twist into a lower portion of the flexible bag.

A method of using a diaper pail assembly according to another aspect of the invention includes installing a flexible bag into a diaper pail assembly, the flexible bag having an outer surface, an inner surface and a lubricating material disposed on at least a portion of the inner surface; engaging the outer surface of the flexible bag to create a restricted portion in the flexible bag; and inserting a waste package into the flexible bag by pushing the waste package downwardly through the restricted portion, whereby the lubricating material facilitates passage of the waste package through the restricted portion.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 18 is a cross-sectional view taken along lines 18-18 in FIG. 17;

FIG. 19 is a cross-sectional view taken along lines 19-19 in FIG. 17;

FIG. 23 is a cross-sectional view taken along lines 23-23 in FIG. 22;

FIG. 24 is a cross-sectional view taken along lines 24-24 in FIG. 22;

FIG. 28 is an exploded cross-sectional view taken along lines 28-28 in FIG. 25;

FIG. 29 is an exploded cross-sectional view taken along lines 29-29 in FIG. 25; and FIG. 30 is an exploded cross-sectional view taken along lines 30-30 in FIG. 25.

DETAILED DESCRIPTION OF THE PREFERRED EMBODIMENT(S)

Figure 1:
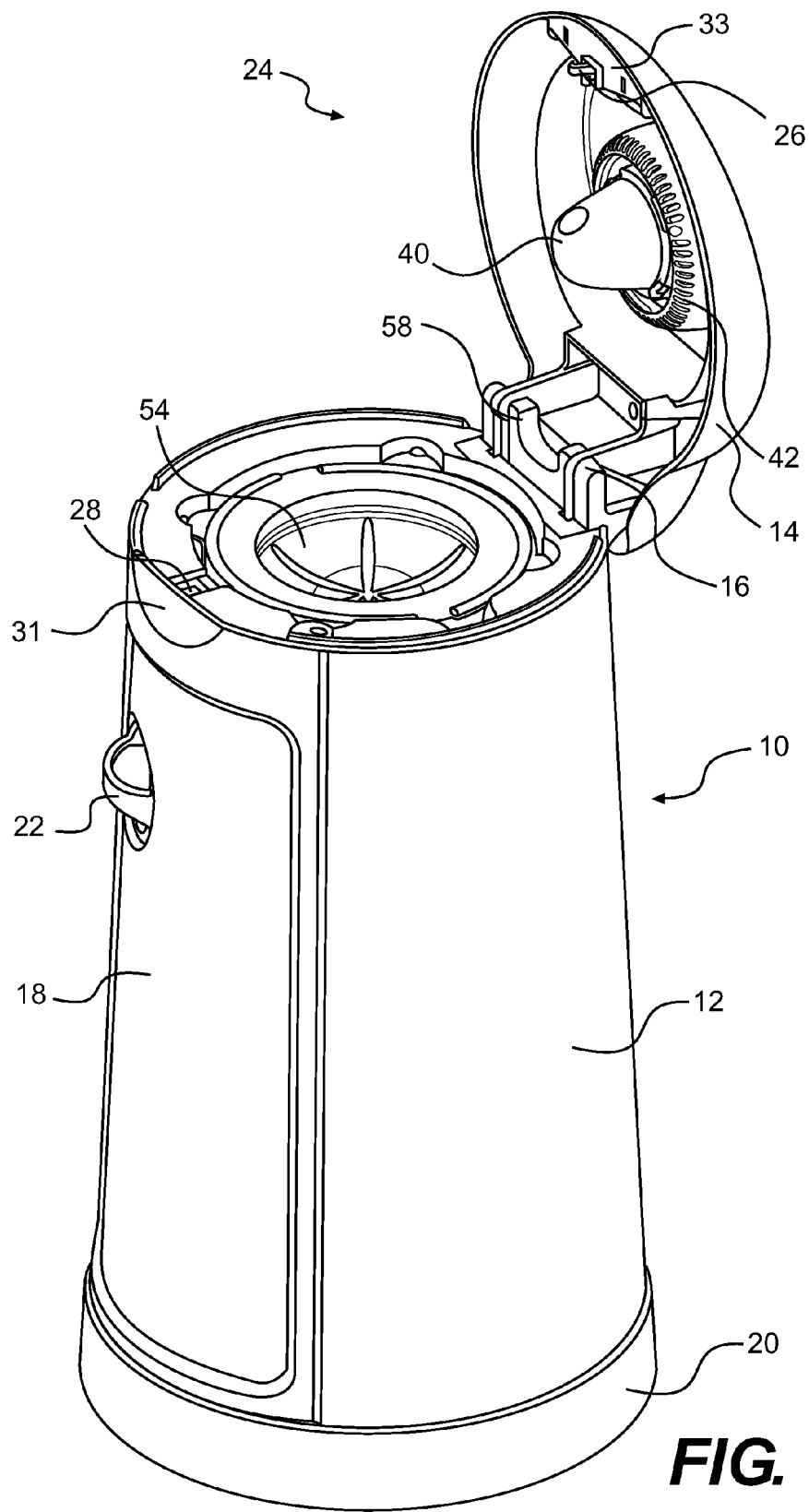
FIG. 1 is a perspective view depicting a diaper pail assembly that is constructed according to a preferred embodiment of the invention, shown in an open position.
Figure 2:
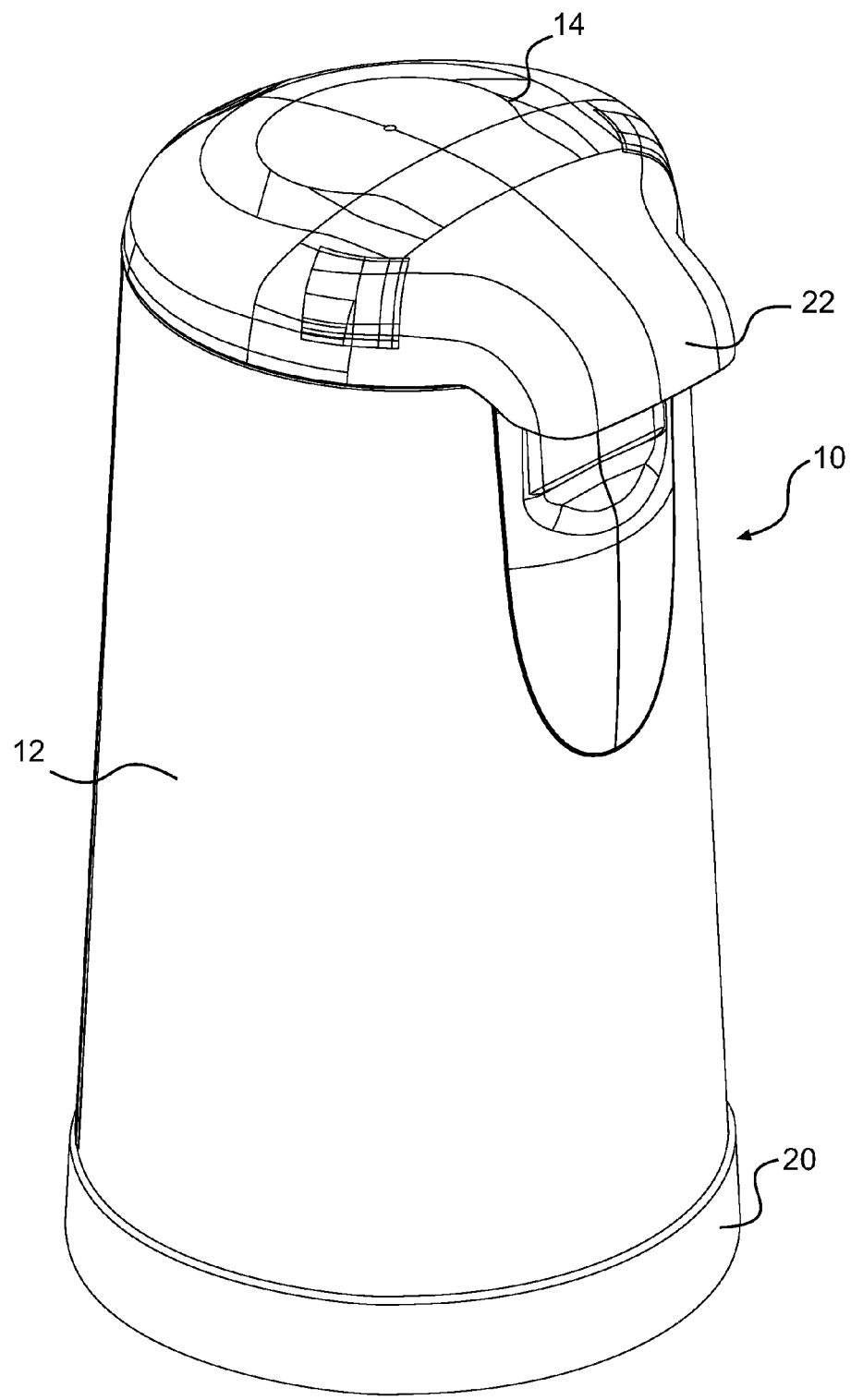
FIG. 2 is a second perspective view depicting the diaper pail assembly that is shown in FIG. 1, shown in a closed position.
Figure 3:
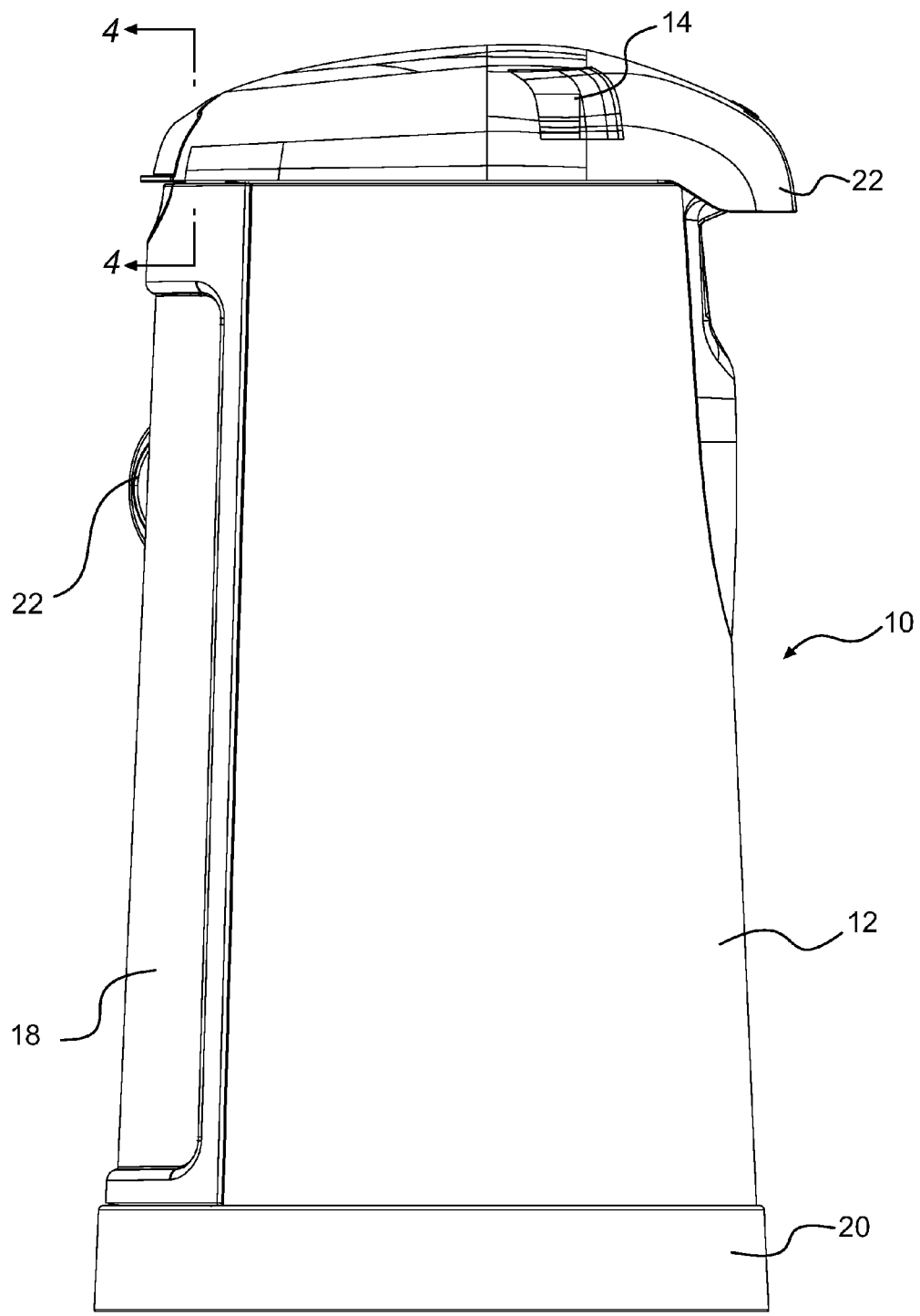
FIG. 3 is a side elevational view depicting the diaper pail assembly that is shown in FIG. 1.

Referring now to the drawings, wherein like reference numerals designate corresponding structure throughout the views, and referring in particular to FIG. 1, a diaper pail assembly or system 10 that is constructed according to a preferred embodiment of the invention includes a housing 12 and a lid member 14. Lid member 14 is connected to the housing 12 by a hinge mechanism 16 so that the lid member 14 can be moved by a parent or caregiver between an open position that is shown in FIG. 1 and a closed position that is shown in FIG. 2.

Figure 5:
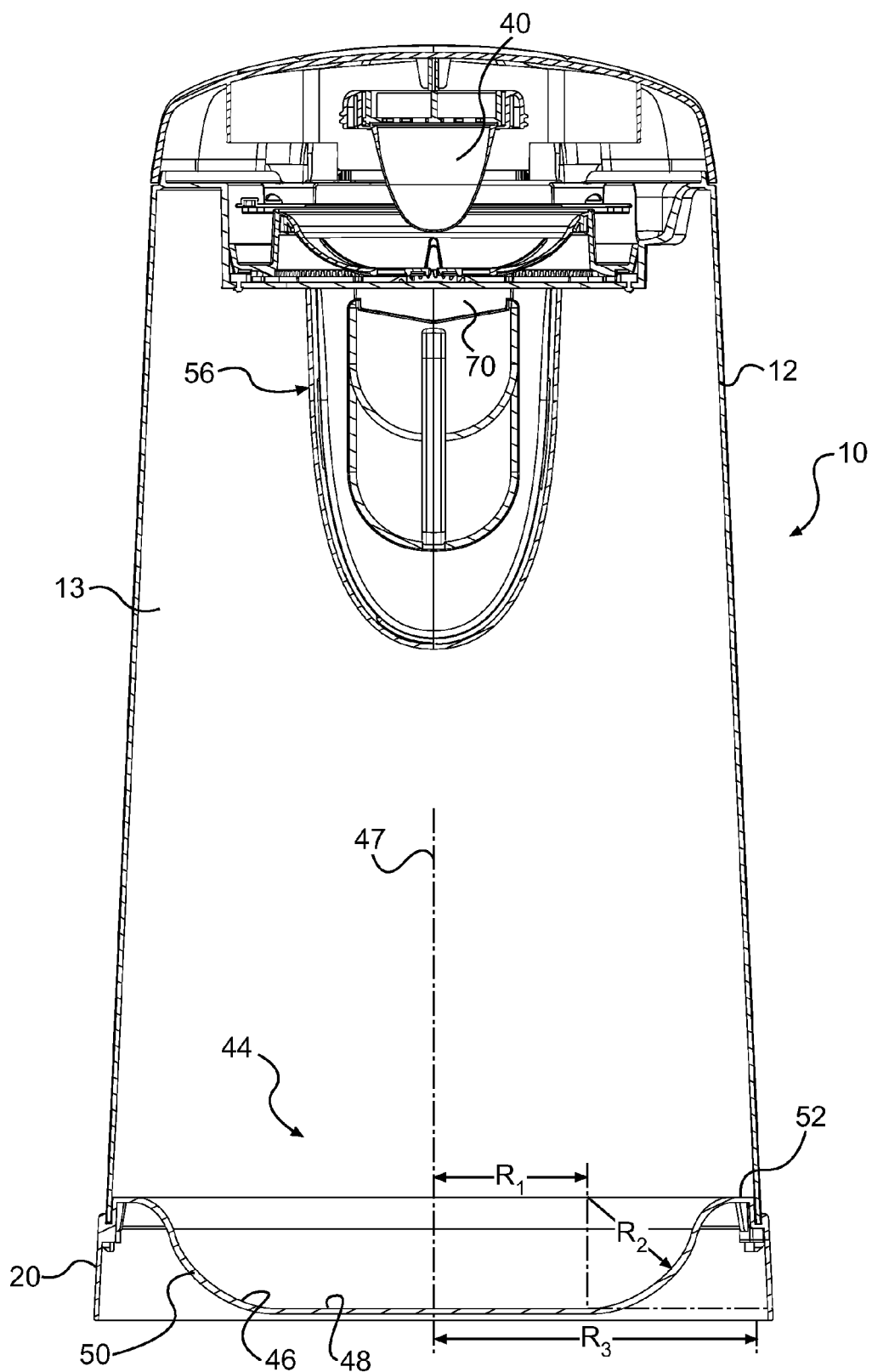
FIG. 5 is another fragmentary cross-sectional view depicting a portion of the diaper pail assembly that is shown in FIG. 1.
Figure 6:
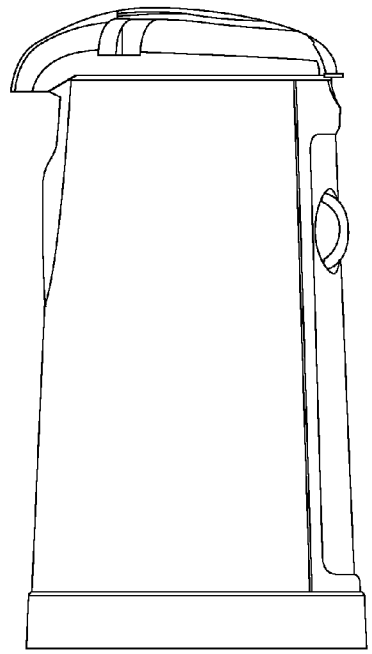
FIG. 6 is a side elevational view depicting the diaper pail assembly that is shown in FIG. 1, shown in a closed position.
Figure 7:
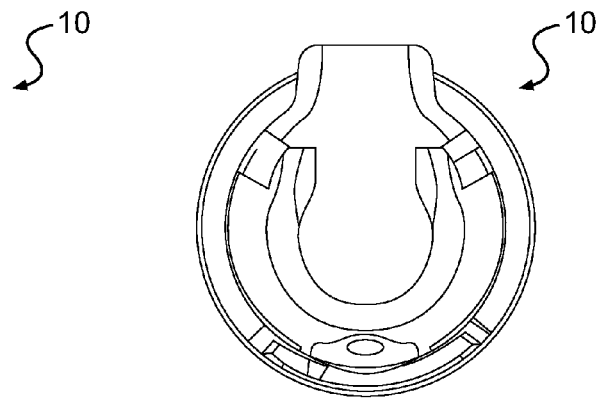
FIG. 7 is a top plan view depicting the diaper pail assembly that is shown in FIG. 6.
Figure 8:
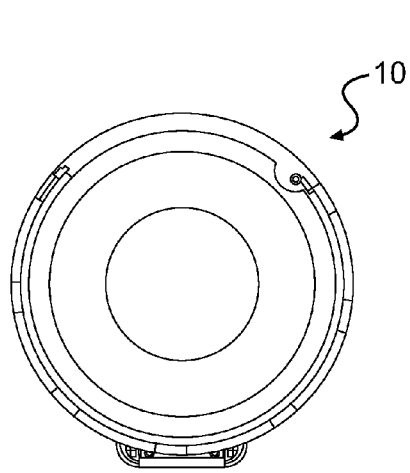
FIG. 8 is a bottom plan view showing the diaper pail assembly that is shown in FIG. 6.
Figure 9:
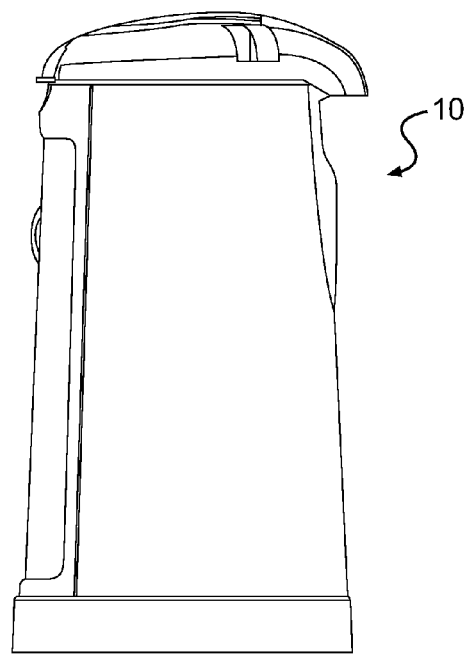
FIG. 9 is a second side elevational view showing the diaper pail assembly that is shown in FIG. 6.
Figure 10:
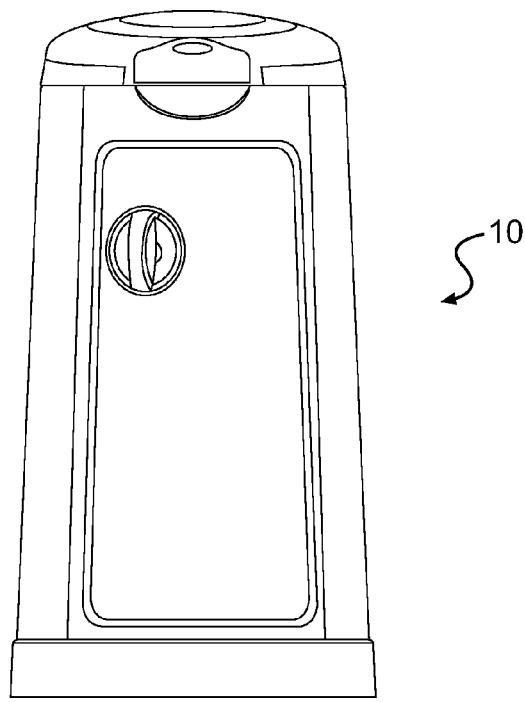
FIG. 10 is a front elevational view depicting the diaper pail assembly that is shown in FIG. 6.
Figure 11:
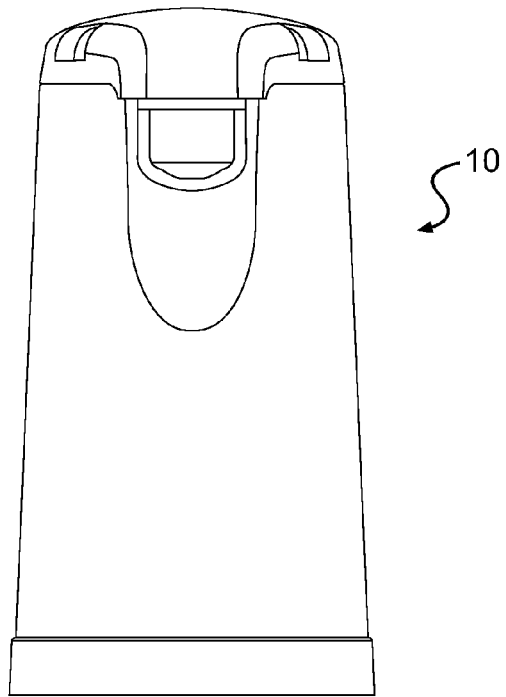
FIG. 11 is a rear elevational view depicting the diaper pail assembly that is shown in FIG. 6.

Housing 12 defines an interior storage space 13, best shown in FIG. 5, which can be accessed by a parent or a caregiver by opening a door 18. The door 18 is hingedly mounted with respect to the housing 12. Diaper pail assembly 10 further includes a base portion 20 that is constructed and arranged to support the housing 12 on an underlying horizontal surface such as a floor or a carpet.

A latching mechanism and gripping knob 22 is provided on the door 18 for permitting the consumer to open and close the door 18 in conventional fashion. The latching mechanism and gripping knob 22 further includes a latch mechanism of conventional design that interengages with a portion of the housing 12 in order to selectively lock the door 18 in a closed position as shown in FIG. 1. The door 18 is also preferably provided with a mechanism for releasably retaining the door 18 in the open position, so that the door 18 will not swing shut at a time that is inconvenient for the consumer.

Figure 4:
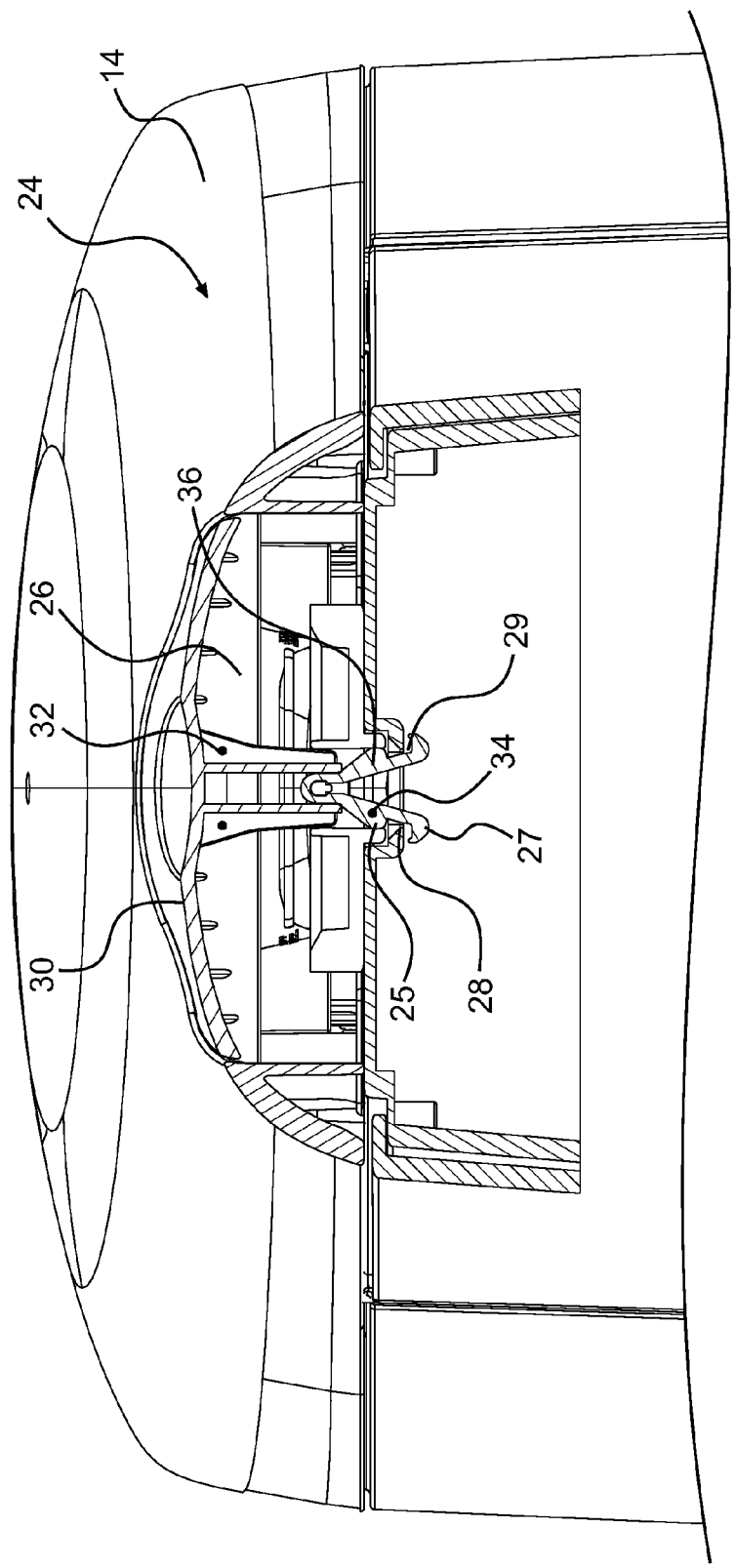
FIG. 4 is a fragmentary cross-sectional view depicting a portion of the diaper pail assembly that is shown in FIG. 1.

A lid latching mechanism 24 includes a laterally expandable latch member 26 that is movably mounted on the lid member 14 and a mating recess 28 that is defined in the housing 12. Referring briefly to FIG. 4, a button or actuating surface 30 is movably mounted on a side of the lid member 14 that is opposite the hinge mechanism 16 and is constrained with respect to the lid member 14 so as to permit only substantially vertically upward and downward movement with respect to the lid member 14. A slotted plunger member 32 is integral with an underside of the actuating surface 30 and is constructed and arranged to cam against outer cam surfaces 25 of an opposed pair of pivotally mounted laterally expandable latch members 34, 36 when the actuating surface 30 is depressed by a consumer. Latch members 34, 36 are biased by an internal spring towards the open position that is shown in FIG. 4.

When a consumer closes the lid member 14, curved lower services 27 of the latch members 34, 36 cam the latch members 34, 36 inwardly, permitting the recessed surfaces 29 of the respective latch members 34, 36 to engage with the surface on the housing 12 that defines the recess 28. This movement creates a temporary deceleration and then a sharp acceleration at the end of the lid closing process that has a tendency to cause a small amount of odor absorbing or odor masking powder to be dispensed from a powder dispensing assembly 40 that is mounted to a mating receptacle 42 that is secured to the underside of the lid member 14, best shown in FIG. 1.

The powder dispensing assembly 40 and its method of operation is preferably constructed as described in co-pending U.S. patent application Ser. No. 12/609,136, filed Oct. 30, 2009, the entire disclosure of which is hereby incorporated by reference as if set forth fully herein.

Powder dispensing assembly 40 is preferably constructed and arranged to dispense a deodorizing or odor-absorbing powder such as sodium bicarbonate into a targeted area of the diaper pail assembly 10. It preferably includes a directional dispensing mechanism including an orifice for dispensing powder from the assembly 40 in such a manner that initial dispersal of the powder is concentrated to a single side of the powder dispensing assembly 40 that is preferably away from the hinge mechanism 16.

When a consumer desires to open the lid member 14 of the diaper pail assembly 10 in order to install a diaper pail bag or dispose an odiferous waste package such as a used disposable diaper, he or she will depress the actuator button 30, which will drive the plunger 32 downwardly, causing the plunger 32 to contact the outer cam surfaces 25 of the respective latch members 34, 36. This will cause the latch members 34, 36 to disengage from the recess 28 and enable the lid member 14 to be lifted upwardly.

An undercut 31 or recess is preferably defined in the housing 12 on an opposite side of housing 12 from the hinge mechanism 16 in order to give the consumer space to be able to exert lifting pressure on a lifting surface 33 of the lid member 14, as may be visualized by viewing FIG. 1. This will enable a parent or caregiver to easily lift the lid member 14 after the lid latching mechanism 24 has been disengaged.

Referring now to FIG. 5, diaper pail assembly 10 advantageously includes structure 44 for aligning and centering a diaper pail bag within the interior storage space 13 of the housing 12. In the preferred embodiment, the aligning and centering structure 44 includes a bottom surface 46 defining a lowermost extent of the interior storage space 13 that includes a central, substantially flat portion 48 and an annular curved portion 50 surrounding the substantially flat portion 48.

Alternatively, the bottom surface 46 could be entirely concavely curved, or the central portion could even have a slight convex curvature. The portion 50 could alternatively achieve its centering and aligning function if it was generally flat, or even slightly convex, as long as it is raised with respect to the central portion 46 and generally annular.

The central substantially flat portion 48 is preferably substantially circular in shape as viewed in top plan and has a maximum radius $R_1$ that is preferably substantially within a range of about 20 mm to about 130 mm, more preferably within a range of about 30 mm to about 100 mm and most preferably within a range of about 45 mm to about 85 mm. Alternatively, the central portion 48 could have a generally oval shape as viewed in top plan.

The annular curved portion 50 occupies a substantial portion of the bottom surface 46 and is substantially concave, having an average radius of curvature $R_2$ that is preferably within a range of about 15 mm to about 120 mm. More preferably, the average radius of curvature $R_2$ of the annular curved portion 50 is substantially within a range of about 25 mm to about 80 mm, and most preferably within a range of about 30 mm to about 60 mm.

In terms of surface area, the curved concave portion 50 is preferably substantially at least 25% of the bottom surface 46 as a whole, more preferably substantially at least 40% of the surface area of the bottom surface 46 and most preferably substantially at least 60% of the surface area of the bottom surface 46.

The bottom surface 46 may additionally include a small upper ledge portion 52 at its extreme outer periphery, connected to the annular concave portion 50 by a concave portion that is shaped to provide a smooth transition between the annular concave portion 50 and the upper ledge portion 52. The entire bottom surface 46 is constructed so as to have a maximum lateral extent, which in the preferred embodiment is represented by a maximum radius $R_3$, that is preferably substantially within a range of about 60 mm to about 250 mm, more preferably substantially within a range of about 80 mm to about 180 mm, and most preferably substantially within a range of about 90 mm to about 150 mm.

A ratio $R_2/R_3$ is preferably substantially within a range of about 0.15 to about 0.95, more preferably substantially within a range of about 0.20 to about 0.60, and most preferably within a range of about 0.25 to about 0.45.

The bottom surface 46 also preferably is fabricated from a material, preferably polypropylene, that has a kinetic coefficient of friction with respect to like material that is substantially within a range of about 0.41 to about 0.71, more preferably substantially within a range of about 0.46 to about 0.66, and most preferably substantially within a range of about 0.51 to about 0.61.

The bottom surface 46 also preferably is fabricated from a material that has a static coefficient of friction with respect to like material that is substantially within a range of about 0.54 to about 0.84, more preferably substantially within a range of about 0.59 to about 0.79, and most preferably substantially within a range of about 0.64 to about 0.74.

The bottom surface 46 and the external surface of the flexible bag 112 are also preferably fabricated from materials that create a relative static coefficient of friction therebetween that is substantially within a range of about 0.30 to about 0.60, more preferably substantially within a range of about 0.35 to about 0.55, and most preferably substantially within a range of about 0.40 to about 0.50.

The bottom surface 46 and the external surface of the flexible bag 112 are also preferably fabricated from materials that create a relative kinetic coefficient of friction therebetween that is substantially within a range of about 0.17 to about 0.47, more preferably substantially within a range of about 0.22 to about 0.42, and most preferably substantially within a range of about 0.27 to about 0.37.

The presence of the annular concave portion 50 has a beneficial effect of aligning and centering the diaper pail bag in order to enhance the effectiveness of the twist seal 120 that will be described in greater detail below and to optimize the space efficiency within the flexible bag 112 and within the internal storage space 13.

Figure 20:
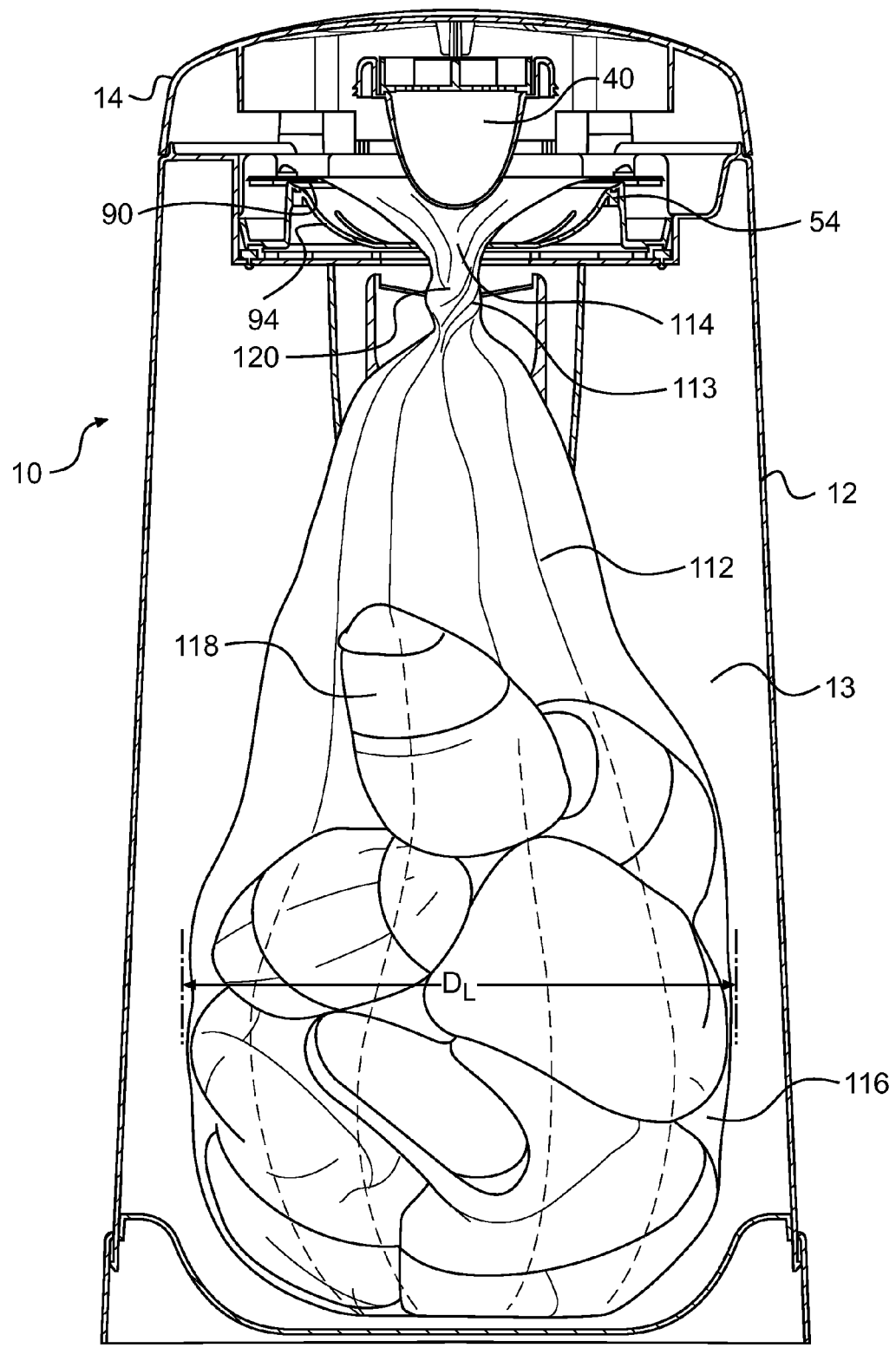
FIG. 20 is a diagrammatical depiction of the diaper pail assembly shown in FIG. 1 in use.

As can be visualized by viewing FIG. 20, the sloped walls of the annular portion 50 will direct the center of mass of a lower portion 116 of the flexible bag 112 radially inwardly toward a longitudinal axis of the housing 12 of the diaper pail assembly 10. As waste packages 118 are inserted into the lower portion 116 of the flexible bag 112, the resulting expansion will tend to occur radially outwardly and evenly in all directions, thus taking advantage of the entire storage space 13 within the housing 12 in a space-efficient manner. As a result, more diapers may be stored within the diaper pail assembly 10 before it needs to be emptied than would otherwise be the case.

Diaper pail assembly 10 further preferably includes a rotatable sealing and gripping member 54 that is constructed and arranged to create a restricted portion within the flexible diaper pail bag 112 in order to provide a temporary odor seal. In the preferred embodiment, this is accomplished by gripping and twisting the flexible diaper pail bag 112 in order to provide a temporary seal, as will be described in greater detail below. Alternatively, the restricted portion could be created by pinching or folding a portion of the flexible bag 112 instead of by twisting it.

A transmission mechanism 56 is provided for causing rotation of the rotatable sealing member 54 for a predetermined rotational distance when the lid member 14 is moved from the open position shown in FIG. 1 to the closed position shown in FIG. 2. Transmission mechanism 56 includes a push rod member 58, visible in FIGS. 1 and 12-14, that is caused and constrained to slide linearly downwardly when the lid member 14 is closed and linearly upwardly when it is opened. Transmission mechanism 56 is designed so as not to cause any movement of the rotatable sealing member 54 when the lid member 14 is pivoted upwardly from the closed position to the open position.

Preferably, transmission mechanism 56 is constructed and arranged to cause the rotatable sealing member 54 to rotate a predetermined angular distance when the lid member 14 is closed. Preferably, this predetermined angular distance is substantially within a range of about 108 degrees to about 540 degrees, more preferably substantially within a range of about of about 120 degrees to about 450 degrees and most preferably substantially within a range of about 162 degrees to about 288 degrees.

Figure 12:
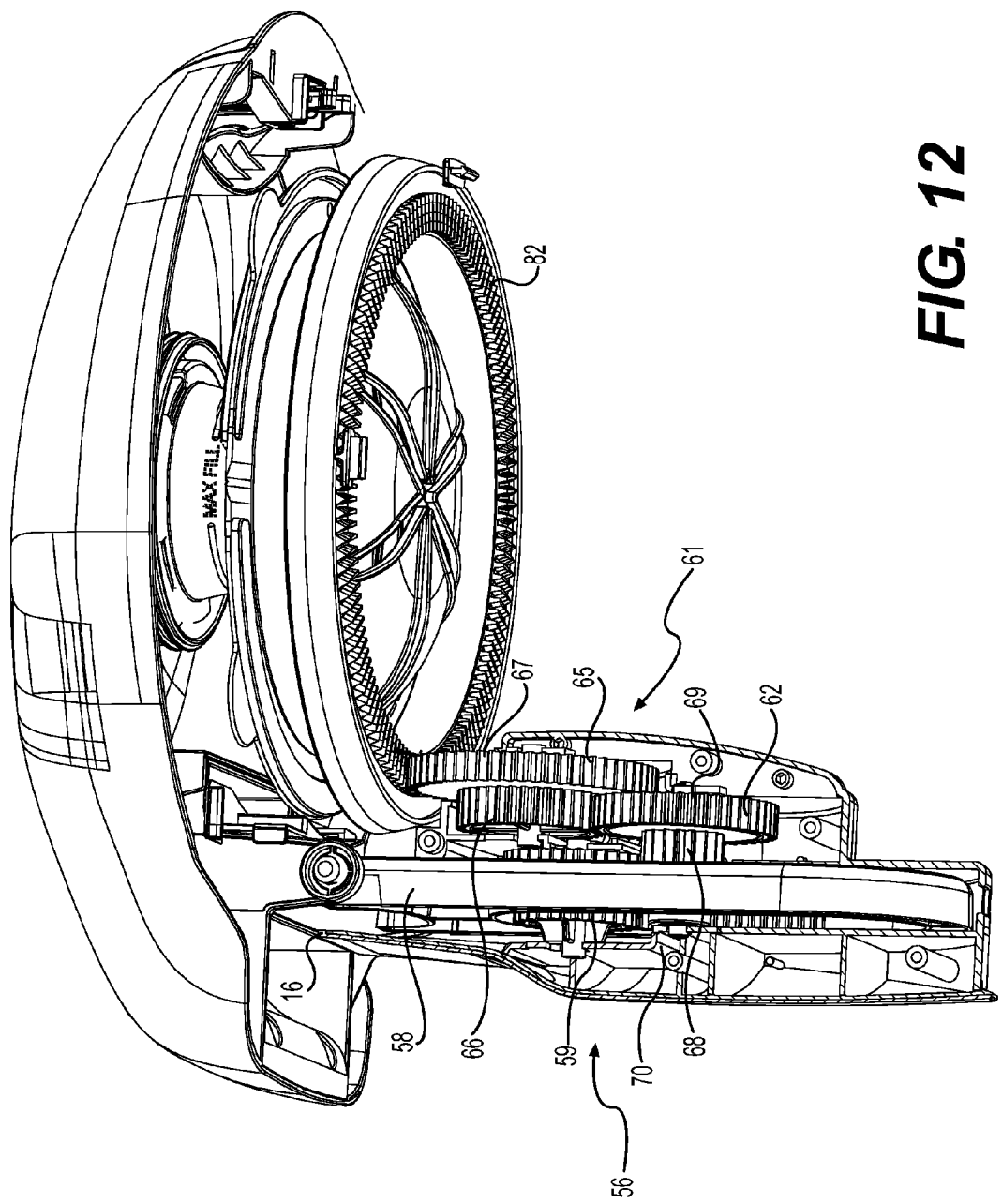
FIG. 12 is a fragmentary perspective view depicting a transmission mechanism within the diaper pail assembly that is shown in FIG. 1.
Figure 13:
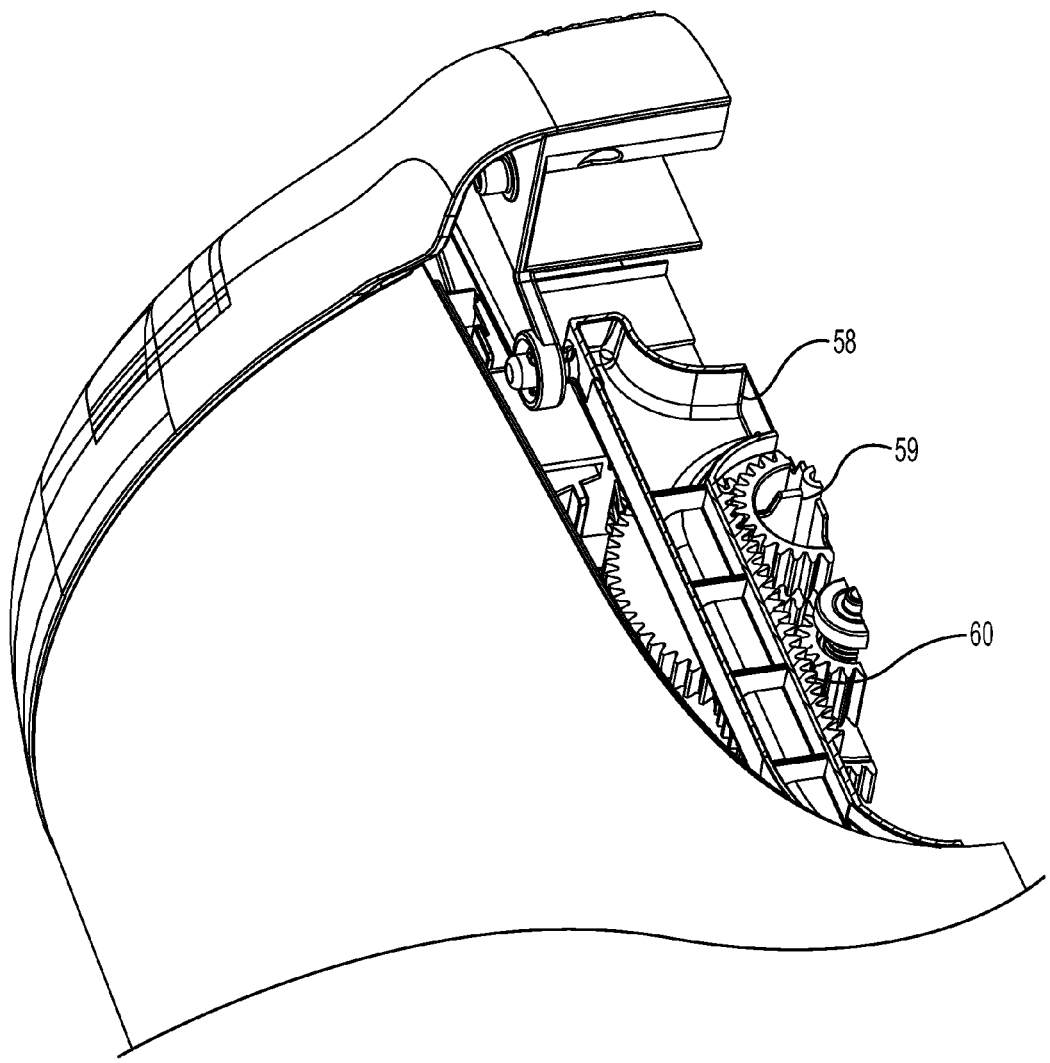
FIG. 13 is a fragmentary perspective view depicting another portion of the transmission mechanism shown in FIG. 12.
Figure 14:
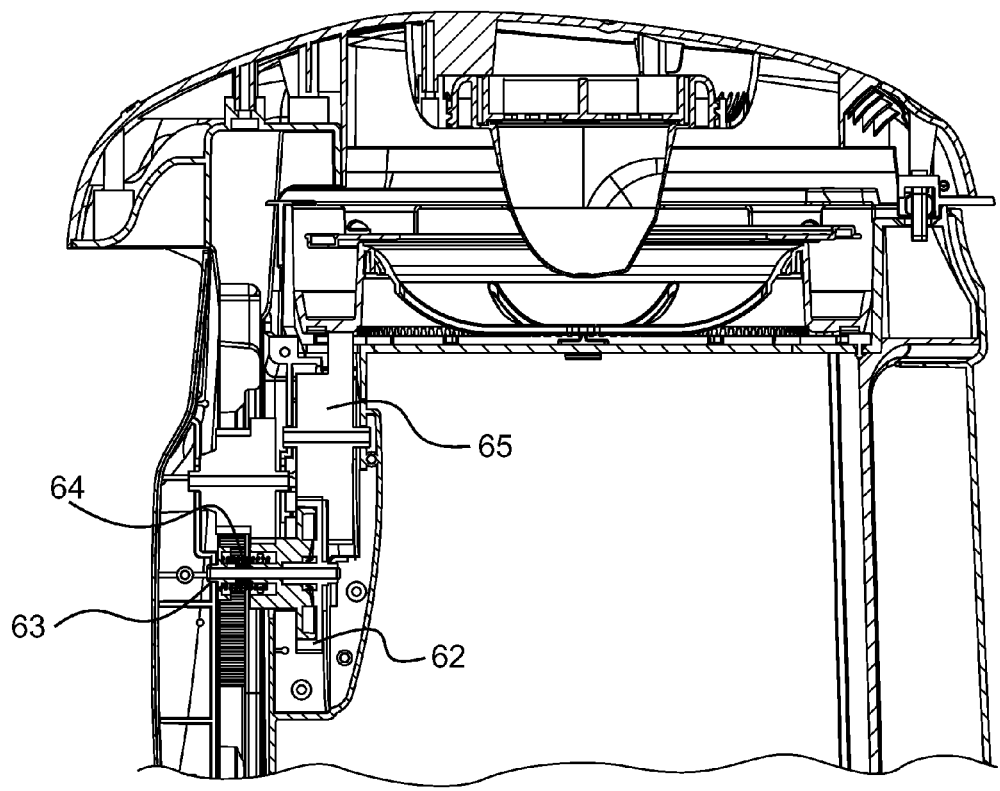
FIG. 14 is a fragmentary cross-sectional view depicting another portion of the transmission mechanism shown in FIG. 12.

Transmission mechanism 56 is depicted in greater detail in FIGS. 12-14. In the preferred embodiment, the push rod member 58 includes a toothed rack portion 60 that is best visible in FIG. 13. The push rod member 58 is constrained to permit only vertical movement thereof with respect to the housing 12 by a slotted channel within the internal housing frame 70. A rack engaging gear 59 is mounted for rotation with respect to the internal housing frame 70 in such a manner that it is permitted a limited amount of vertical movement with respect to the internal housing frame 70. Rack engaging gear 59 has teeth that are operatively engaged with corresponding teeth on the toothed rack portion 60 when the rack engaging gear 59 is in its lowermost vertical position.

Transmission mechanism 56 further includes a second compound gear 62 having a first gear portion 68 and a second gear portion 69 that have common axes of rotation and are joined for common movement except when a predetermined transmission force therebetween is exceeded, when a clutch mechanism 63 will incrementally permit relative angular displacement therebetween in order to relieve internal forces within the transmission mechanism 56 and avoid damage to the diaper pail assembly 10.

The first gear portion 68 is operatively engaged with the rack engaging gear 59, and the second gear portion 69 is operatively engaged with a third compound gear 65 having a first gear portion 66 and a second gear portion 67. The third compound gear 65 is formed so that the first and second gear portions 66, 67 are integrally formed and are mounted for common rotation about a common axis. The first gear portion 66 of the third compound gear 65 is in operative engagement with the second gear portion 69 of the second compound gear 62. The second gear portion 67 of the third compound gear 65 is in operative engagement with a toothed rack portion 82 that is formed on an underside of a rotatable flexible bag retaining and sealing member 54 that will be discussed in greater detail below.

When the lid member 14 is pivoted downwardly by a parent or caregiver from the open position that is shown in FIG. 1 to the closed position that is shown in FIG. 2, the push rod member 58 will be driven downwardly and the rotatable flexible bag retaining and sealing member 54 will be driven by the gear train mechanism 61 to rotate for the predetermined angular distance, thereby creating a twisted portion 120 in an intermediate portion 113 of the flexible bag 112 that is between a lower or bottom portion 116 and an upper portion 114. This is diagrammatically shown in FIG. 20.

The gear train mechanism 61 is operatively interconnected when the push rod member 58 moves downwardly, because the rack engaging gear 59 is in its lowermost vertical position and operatively engaged with the second compound gear 62. However, when the lid member 14 is pivoted upwardly from the closed position to the open position, the rack engaging gear 59 is lifted upwardly out of engagement with the second compound gear 62. Accordingly the gear train mechanism 61 will be disengaged and there will be no rotation of the flexible bag retaining and sealing member 54 when the lid member 14 is opened, which allows the twisted bag to remain closed.

As may be visualized by viewing FIG. 20, the motion of pushing the waste package 118 downwardly through the twisted portion 120 may have the temporary effect of reducing the degree of twist in the twisted portion 120. However, when the lid member 14 is closed, the amount of twist in the twisted portion 120 is increased, which reinforces the quality of the odor seal that is created by the twisted portion 120.

In the event that the gear train mechanism 61 becomes jammed, internal forces within the gear train mechanism 61 will cause the clutch mechanism 63 to permit a relative amount of relative movement between the first gear portion 68 and the second gear portion of the second compound gear 62. Clutch mechanism 63 includes two relatively slidable components that are biased together by a spring member 64, best shown in FIG. 14, which is operatively interposed between the second compound gear 62 and the internal housing frame 70.

Figure 16:
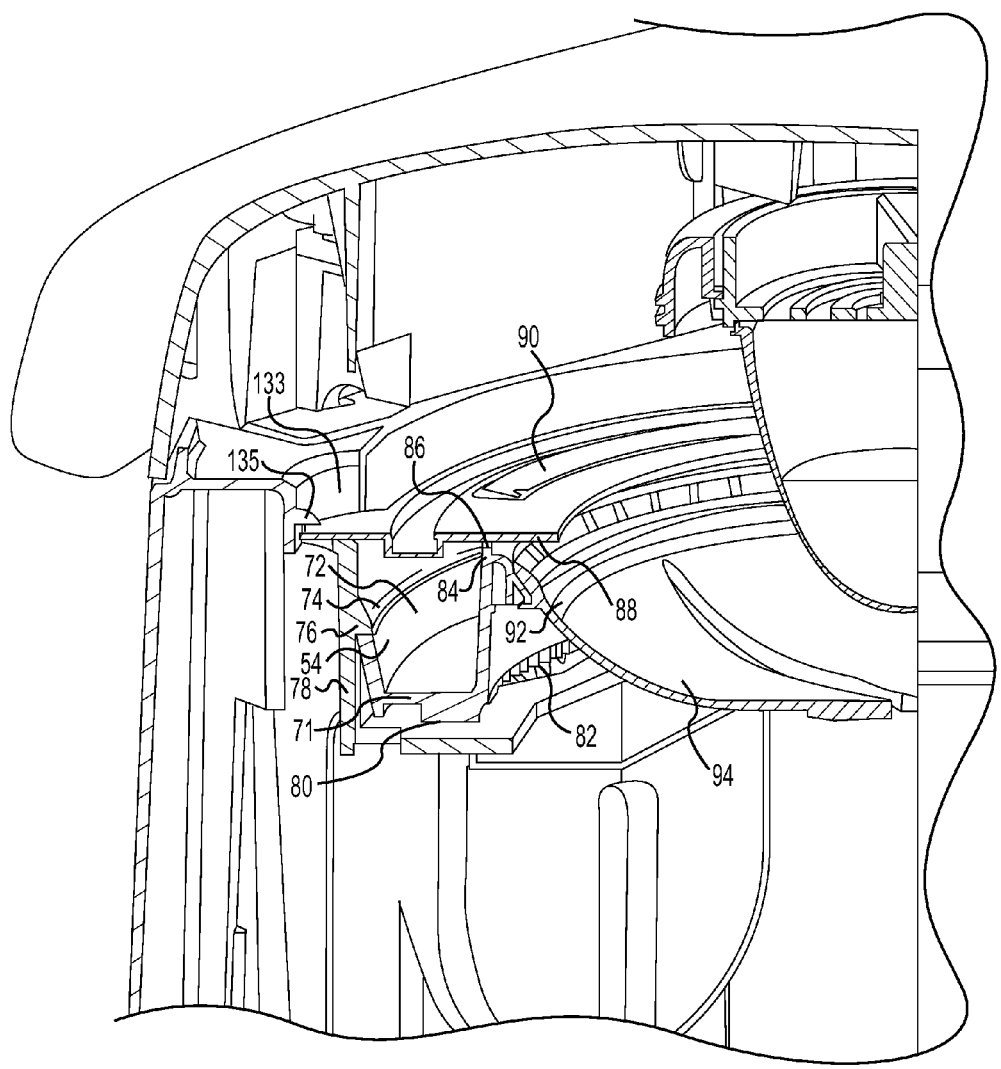
FIG. 16 is a fragmentary perspective view depicting a portion of the diaper pail assembly that is shown in FIG. 1.

Referring now to FIG. 16, the flexible bag retaining and sealing member 54 preferably includes a main body portion 71 having an outer flange 72 that defines an upper surface 74, which is preferably substantially flat. Alternatively, the upper surface 74 could be shaped so that it is slightly convex. A plurality of retaining members 76 are defined as projections that are integral with a portion 78 of the internal housing frame 70. These are constructed and arranged to vertically constrain the flexible bag retaining and sealing member 54 so that is permitted to rotate with respect to the internal housing frame 70 but is precluded from upward vertical movement.

The retaining members 76 and the upper surface 74 of the outer flange 72 are preferably constructed and arranged to minimize relative friction therebetween. The relative kinetic coefficient of friction between the retaining members and the upper surface 74 is preferably substantially within a range of about 0.12 to about 0.32, and more preferably substantially within a range of about 0.17 to about 0.27.

The relative static coefficient of friction between the retaining members and the upper surface 74 is preferably substantially within a range of about 0.23 to about 0.43, and more preferably substantially within a range of about 0.28 to about 0.38.

Figure 15:
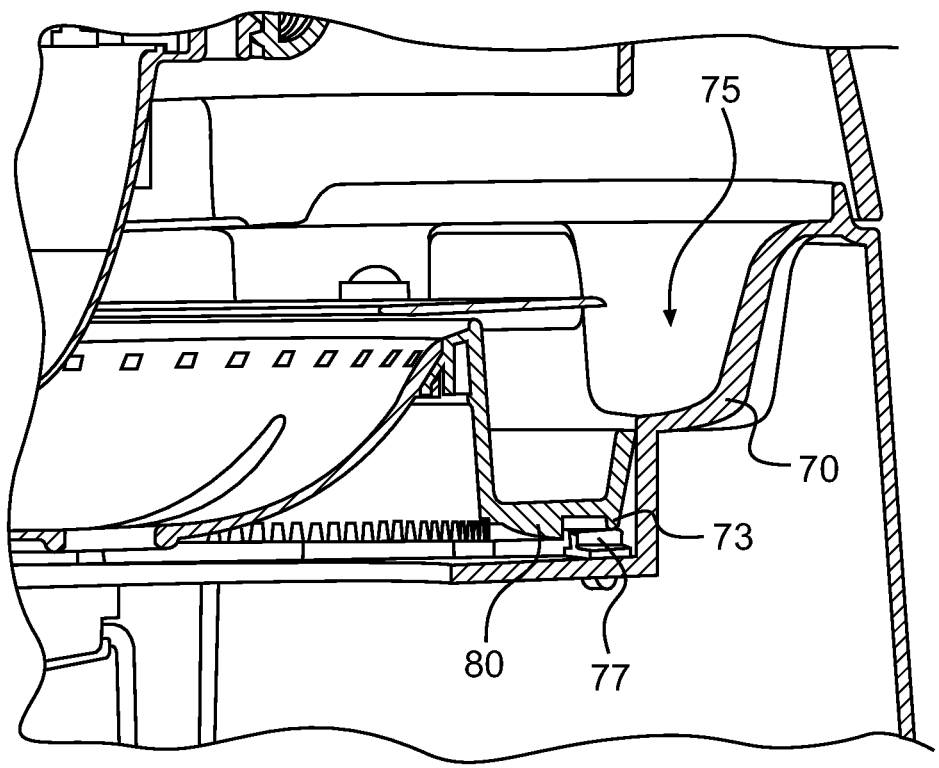
FIG. 15 is a fragmentary cross-sectional view depicting another portion of the diaper pail assembly that is shown in FIG. 1.

In addition, a lower surface 80 of the outer flange 72 is supported for low friction rotation with respect to the internal housing frame 70 by a plurality of bearing members 77, as is best shown in FIG. 15. In the preferred embodiment, the bearing members 77 are positioned to bear against a lower surface of a lower outer flange projection 73 of the outer flange 72. Bearing members 77 are preferably fabricated out of a material having a relatively low coefficient of friction, such as nylon, polytetrafluoroethylene (PTFE) or polyoxymethylene (POM). Most preferably, bearing members 77 are fabricated from POM.

FIG. 15 also shows that the housing 12 preferably has a finger access recess 75 defined therein for permitting a parent or caregiver to place a finger against the lower surface 88 of the bag frame 90 in order to prise the bag frame 90 upwardly in order to disengage it from the housing 12. The consumer will perform such an action when removing the flexible bag assembly 110 from the diaper pail assembly 10. The inherent flexibility of the bag frame 90 permits the bag frame 90 to be elastically deformed to the extent that is necessary to remove it from the housing 12 in this manner.

Referring again to FIG. 16, the main body portion 71 of the flexible bag retaining and sealing member 54 preferably includes an upper flange portion 84 having a narrow, convexly curved upper surface 86 that defines a low friction surface for supporting a lower surface 88 of a bag frame 90 that is part of a flexible bag assembly 110.

The upper surface 86 of the upper flange portion 84 preferably has a kinetic frictional coefficient with respect to like material that is substantially within a range of about 0.30 to about 0.50, and that is more preferably substantially within a range of about 0.35 to about 0.45. This ensures that the flexible bag retaining and sealing member 54 can simultaneously perform the function of supporting the underside of the bag frame 90 while being able to freely rotate with minimal friction. The flexible bag assembly 110 will be described in greater detail below.

The main body portion 71 of the flexible bag retaining and sealing member 54 is preferably fabricated from a rigid plastic material, such as nylon, acetyl or POM, most preferably the latter, and preferably has a relatively low frictional coefficient with respect to like material. The flexible bag retaining and sealing member 54 further includes a radially inner resilient portion 92 including a plurality of inwardly extending resilient finger members 94 that are configured to operatively interact with the flexible bag 112 in a complex manner that includes engaging the intermediate portion 113 of the flexible bag 112 to create a twisted portion 120 in order to effectively seal odors within the lower portion 116 of the flexible bag assembly 110 during use. This may be visualized by viewing FIG. 20.

The inner resilient portion 92 of the flexible bag retaining and sealing member 54 is also constructed in such a manner to make it easy for a parent or caregiver to push the lower portion 116 of the bag assembly 110 through the central portion of the inner resilient portion 92 during initial installation of a flexible bag assembly 110 into the diaper pail assembly 10. This is achieved through a combination of the unique shape of the individual resilient finger members 94, the shape of the spaces or slots 95 that are defined between the individual finger members 94 and the degree of elasticity and frictional characteristics of both the finger members 94 and the outer and inner surfaces of the flexible bag 112.

Figure 17:
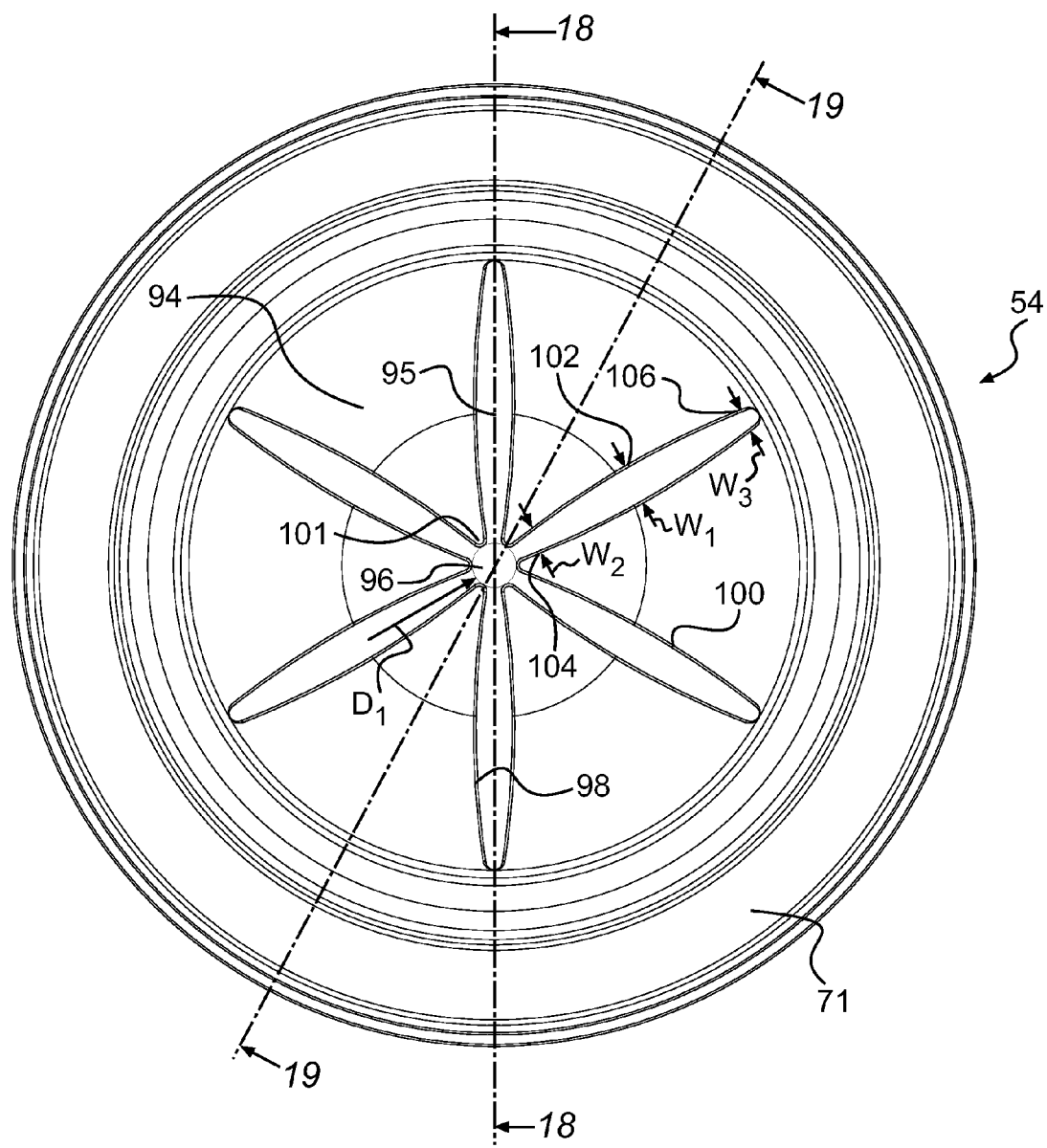
FIG. 17 is a top plan view of one component of the diaper pail assembly that is shown in FIG. 1.

FIG. 17 is a top plan view of a flexible bag retaining and sealing member 54 that is constructed according to a preferred embodiment of the invention. In this embodiment, six resilient finger members 94 are spaced about an inner periphery of the main body portion 71 and extend radially inwardly to a central opening 96. Six spaces or slots 95 are respectively defined between the adjacent finger members 94, with each of the finger members 94 and spaces 95 having substantially the same shape and dimensions in the preferred embodiment. Alternatively, the shape of the finger members 94 and the slots 95 could be varied.

Each of the finger members 94 includes a distal, radially innermost end portion terminating at a convexly radiused tip 101 that is preferably shaped to have a radius of curvature that is substantially within a range of about 0.5 mm to about 3.0 mm. More preferably, the convexly radius tips 101 are shaped to have radius of curvature that is substantially within a range of about 0.9 mm to about 1.9 mm. Tip portion 101 is also preferably thickened with respect to adjacent portions of the flexible fingers 94, as is discussed below.

The convexly radiused tips 101 of the respective finger members 94 together define the central opening 96, which preferably has a minimum diameter $D_1$ that is substantially within a range of about 3 mm to about 13 mm, and more preferably within a range of about 5 mm to about 11 mm. Most preferably, the minimum diameter $D_1$ is substantially within a range of about 6 mm to about 10 mm.

Each of the finger members 94 is also preferably shaped so as to have a pair of side edges 98, 100, each of which is curved and preferably slightly concave so that each of the spaces defined by a pair of the opposing side edges 98, 100 is wider in a radially intermediate location than it is at the radially innermost location and a radially outermost locations. The average radius of curvature of each of the side edges 98 is preferably substantially within a range of about 50 mm to about 400 mm, and more preferably substantially within a range of about 100 mm to about 250 mm. The curvature of the opposing side edges 98, 100 can be substantially constant, or it can alternatively be variable or formed of two or more compound curves.

As FIG. 17 shows, the finger members 94 are preferably shaped and sized so that at least one of the spaces 95, when in an unstressed position, has a first width $W_1$ at a first location 102, which is preferably at an intermediate radial location along the finger members 94 where the width of the space 95 is at a maximum. Preferably, the first location 102 is located substantially at a radial midpoint of the opposing adjacent finger members 94. Each space 95 further has a second width $W_2$ at a second location 104, which is preferably near the distal end of the respective finger members 94 where the width is at a minimum. The first width $W_1$ is preferably greater than the second width $W_2$.

The space 95 further has a third width $W_3$ defined at a third location 106 that is preferably near the radially outermost, proximal end of the respective finger members 94 where the width is at a minimum. The first width $W_1$ is preferably greater than the third width $W_3$.

The first, second and third locations 102, 104, 106 are accordingly radially spaced from each other, with the first location 102 being radially intermediate between the second and third locations 104, 106.

The first width $W_1$ is preferably substantially within a range of about 3 mm to about 11 mm, more preferably substantially within a range of about 4.5 mm to about 9.5 mm, and most preferably substantially within a range of about 6 mm to about 8 mm.

The second width $W_2$ is preferably substantially within a range of about 0.5 mm to about 5 mm, and more preferably within a range of about 1.5 mm to about 3.5 mm.

A ratio of the first width $W_1$ to the second width $W_2$ is preferably substantially within a range of about 1.5 to about 4.0, and more preferably substantially within a range of about 2.0 to about 3.5.

The third width $W_3$ is preferably substantially within a range of about 0.5 mm to about 5 mm, and more preferably within a range of about 1.5 mm to about 3.5 mm.

A ratio of the first width $W_1$ to the third width $W_3$ is preferably substantially within a range of about 1.5 to about 4.0, and more preferably substantially within a range of about 2.0 to about 3.5.

FIGS. 18 and 19 are cross-sectional views taken along lines 18-18 and 19-19, respectively, in FIG. 17. These figures show that each of the resilient finger members 94 includes an upper surface 97 that is curved concavely with a varying radius of curvature so that the radially outermost portion between the first and third locations 102, 106 as viewed in FIG. 17 has a smaller radius of curvature and is therefore more curved than the radially innermost portion between the first and second locations 112, 104. Accordingly, each of the resilient finger members 94 initially curves downwardly from its proximal connection to the main body portion 71 and then flattens out, extending substantially horizontally from its intermediate portion to its most distal portion. The lower surfaces 99 accordingly have a convex curvature that is more pronounced in the proximal portion of the finger 94 than in the distal portion.

The lower surfaces 99 of each of the respective resilient finger members 94 are also preferably spaced from the upper surface 97 so that each of the finger members 94 has a substantially constant thickness, which is preferably substantially within a range of about 0.5 mm to about 3.0 mm, and more preferably substantially within a range of about 1.0 mm to about 2.0 mm.

The distal, radially innermost tip portions 101 of the finger members 94 are preferably slightly thickened with respect to the adjacent blade portions, as is best shown in FIG. 19. The thickened tip portions 101 preferably have a thickness that is preferably substantially within a range of about 1.0 mm to about 6.0 mm, and more preferably substantially within a range of about 1.5 mm to about 4.5 mm.

The resilient finger members 94 are preferably fabricated from a flexible elastomeric material, which is most preferably a plastic material such as a thermoplastic urethane (TPU) material having a Shore A hardness that is preferably substantially within a range of about 60 to about 120, is more preferably substantially within a range of about 70 to about 110 and most preferably substantially within a range of about 80 to about 100. Alternatively, a thermoplastic elastomer (TPE) material or a thermoplastic resin (TPR) could be used.

The material from which the resilient finger members 94 are fabricated preferably has a static coefficient of friction with respect to like material that is substantially within a range of about 0.70 to about 0.95, that is more preferably substantially within a range of about 0.80 to about 0.94 and that is most preferably substantially within a range of about 0.85 to about 0.89. This material further preferably has a kinetic coefficient of friction with respect to like material that is substantially within a range of about 0.37 to about 0.67, more preferably substantially within a range of about 0.42 to about 0.62 and that is most preferably substantially within a range of about 0.47 to about 0.57.

In addition, at least the portions of each of the resilient finger members 94 that will contact the flexible bag 112 preferably has a static coefficient of friction with respect to the external surface of the flexible bag 112 that is substantially within a range of about 0.59 to about 0.89, that is more preferably substantially within a range of about 0.64 to about 0.84 and that is most preferably substantially within a range of about 0.69 to about 0.79. This material further preferably has a kinetic coefficient of friction with respect to the external surface of the flexible bag 112 that is substantially within a range of about 0.34 to about 0.64, more preferably substantially within a range of about 0.39 to about 0.59 and that is most preferably substantially within a range of about 0.44 to about 0.54.

The external surface of the flexible bag 112 is preferably fabricated from a material that has a static coefficient of friction with respect to like material that is substantially within a range of about 0.18 to about 0.48, that is more preferably substantially within a range of about 0.23 to about 0.43 and that is most preferably substantially within a range of about 0.28 to about 0.38. This material further preferably has a kinetic coefficient of friction with respect to like material that is substantially within a range of about 0.12 to about 0.47, more preferably substantially within a range of about 0.15 to about 0.42 and that is most preferably substantially within a range of about 0.18 to about 0.38.

The internal surface of the flexible bag 112 is preferably fabricated from a material that has a static coefficient of friction with respect to like material that is substantially within a range of about 0.17 to about 0.47, that is more preferably substantially within a range of about 0.22 to about 0.42 and that is most preferably substantially within a range of about 0.27 to about 0.37. This material further preferably has a kinetic coefficient of friction with respect to like material that is substantially within a range of about 0.08 to about 0.38, more preferably substantially within a range of about 0.13 to about 0.33 and that is most preferably substantially within a range of about 0.18 to about 0.28.

FIG. 20 is a diagrammatical depiction of a diaper pail assembly 10 that is constructed according to the preferred embodiment of the invention, shown in operation. A bag assembly 110 having a bag frame portion 90 that is attached to an upper portion 114 of a flexible bag 112 is installed by a parent or caregiver into the diaper pail assembly 10 by seating the bag frame 90 into the housing 12 of the diaper pail assembly 10 in a manner that will be described in greater detail below.

The parent or caregiver will then push the lower portion 116 of the flexible bag 112 downwardly into the internal storage space 13 of the housing 12 by pushing it through the resilient flexible fingers 94 of the flexible bag retaining and sealing member 54. The lid member 14 is then closed, which causes the flexible bag retaining and sealing member 54 to rotate by a predetermined angular distance to create a twisted portion 120 in the intermediate portion 113 of the flexible bag 112.

The parent or caregiver will use the diaper pail assembly 10 by inserting a waste load package 118 such as a used disposable diaper into the lower portion 116 of the flexible bag 112 by pushing it downwardly through the twisted portion 120 of the intermediate portion 113 of the flexible bag 112. This is performed against the resistance bias that is applied by the resilience of the resilient finger members 94. As the parent or caregiver pushes the waste load package 118 downwardly through the twisted portion 120, the tapered, leaf-like pattern of each resilient finger member 94 and space 95 helps the bag 112 slide along the opposed edges 98, 100 that define the space 95. In addition, when the lid member 14 is closed, the tapered, leaf-like pattern of each resilient finger member 94 and space 95 helps to reduce drag between the bag 112 and the flexible bag retaining and sealing member 54.

The bottom portion 116 of the flexible bag 122 is not expected to move substantially with respect to the housing 12 during the creation of the twisted portion 120, particularly when it is weighted down by a number of waste packages 118. Accordingly, the degree of twist that is created in the flexible bag 112 by the rotation of the retaining and sealing member 54 when the lid member 14 is closed is expected to be comparable and at least equal to the predetermined amount of angular rotation of the retaining and sealing member 54. In practice, the degree of twist in the flexible bag 112 will be more than the predetermined amount of angular rotation of the retaining and sealing member 54 after insertion of the second waste package 118, because a certain amount of residual twisting will remain in the twisted portion 120 even after the first waste package 118 is pushed through the twisted portion 120.

As is described in greater detail below with reference to FIG. 31, both the external and internal surfaces of the flexible bag 112 is also preferably treated with a friction reducing slip agent in order to further reduce drag between the bag 112 and the flexible bag retaining and sealing member 54. The internal surface is further treated or impregnated with a blocking agent in order to further reduce internal friction both with respect to itself and with respect to the waste packages 118.

As the consumer pushes the waste load package 118 downwardly through the twisted portion 120, the inherent resilience of the flexible bag 112 at the twisted portion 120 in conjunction with the inward resilient bias that is imparted to the outer surface of the flexible bag 112 by the resilient finger members 94 keep the outermost portions of the waste package 118 tightly against the inner surface of the flexible bag 112, which maintains an effective odor seal even during insertion of the waste package 118 into the lower portion 116 of the flexible bag 112. This minimizes leakage of odor from the lower portion 116 of the flexible bag 12 through the twisted portion 120 where it could be detected by the parent or caregiver.

When the lid member 14 is closed, powder material such as sodium bicarbonate is dispensed from the powder disperser 40 into the upper portion 114 of the flexible bag 112, above the twisted intermediate portion 113. The powder material is retained in the upper portion 114 above the twisted intermediate portion 113 of the flexible bag 112 for a period of time before a portion of it is swept by the parent or caregiver into the lower portion 116 of the flexible bag as the parent of caregiver pushes a waste package 118 downwardly through the twisted intermediate portion 113. The powder material accordingly deodorizes or absorbs odor in the upper area of the diaper pail assembly 10 for a period of time when it is positioned within the upper portion 114 of the flexible bag 112, and later in the lower portion 116 of the flexible bag 112.

Figure 31:
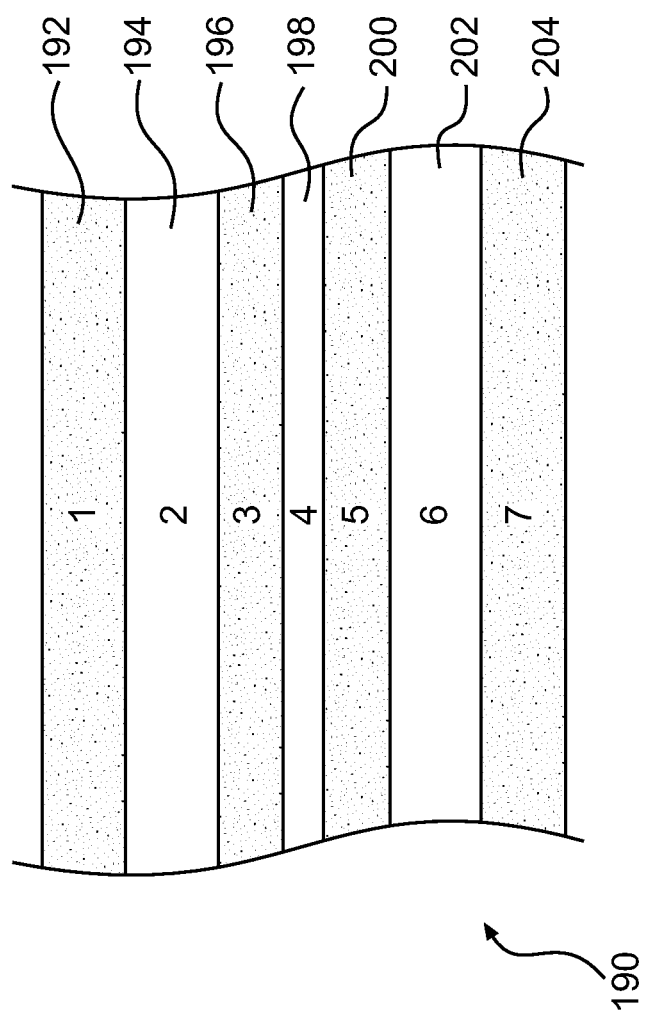
FIG. 31 is a diagrammatical depiction of the film material that is used in the diaper pail bag assembly shown in FIG. 21.

The process of pushing a waste package 118 such as a wrapped, used disposable diaper through the intermediate, twisted portion 113 of the flexible bag 112 is facilitated by the low static and kinetic frictional characteristics of the innermost layer 204 of the film material 190, shown in FIG. 31. Moreover, the presence of the powder material provides additional lubrication to the inner surface of the flexible bag 122 in the area of the twisted intermediate portion 113.

To that end, the powder material, which is preferably sodium bicarbonate, has a preferred granularity that is expressed as a mean particle size maximum dimension that is substantially within a range of about 40 microns to about 140 microns. More preferably the mean particle size maximum dimension is substantially within a range of about 60 microns to about 120 microns and most preferably substantially within a range of about 80 microns to about 100 microns.

The powder material also preferably has a bulk density that is substantially within a range of about 48 lb/ft$^3$ to about 78 lb/ft$^3$, more preferably within a range of about 53 lb/ft$^3$ to about 73 lb/ft$^3$ and most preferably within a range of about 58 lb/ft$^3$ to about 68 lb/ft$^3$.

Figure 21:
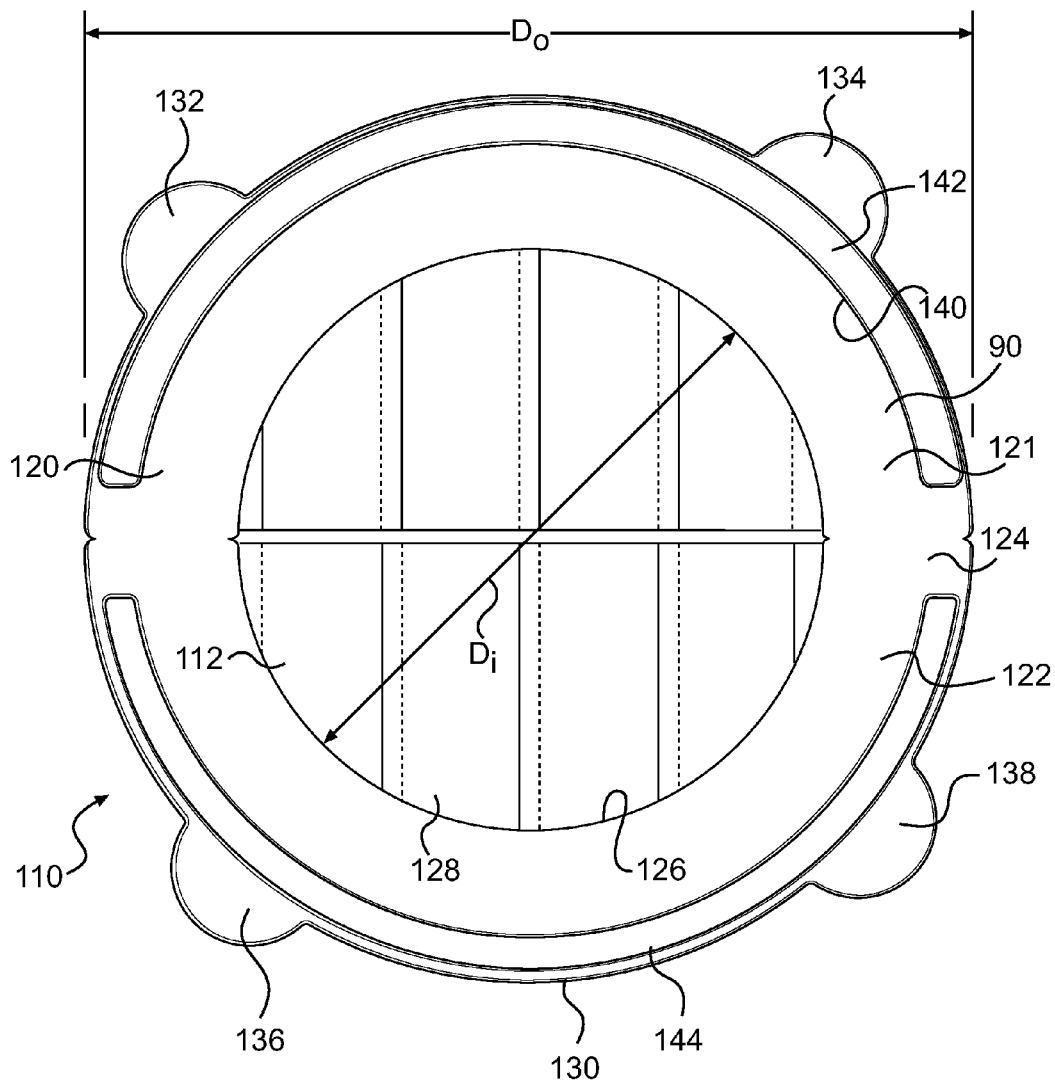
FIG. 21 is a top plan view of a diaper pail bag assembly that is constructed according to the preferred embodiment of the invention.

FIG. 21 is a top elevational view of a flexible bag assembly 110 that is constructed according to a preferred embodiment of the invention. Flexible bag assembly 110 includes a flexible bag 112 that is preferably pleated so as to permit the lower portion 116 of the flexible bag 112 to expand to a cross-sectional area that is greater than the cross-sectional area of the flexible bag 112 at its point of attachment to the bag frame 90.

Bag frame 90 is preferably fabricated from a plastic material such as high density polyethylene, and includes a first portion 120 that is generally semicircular in shape and a second portion 122 that is also generally semicircular in shape.

Figure 22:
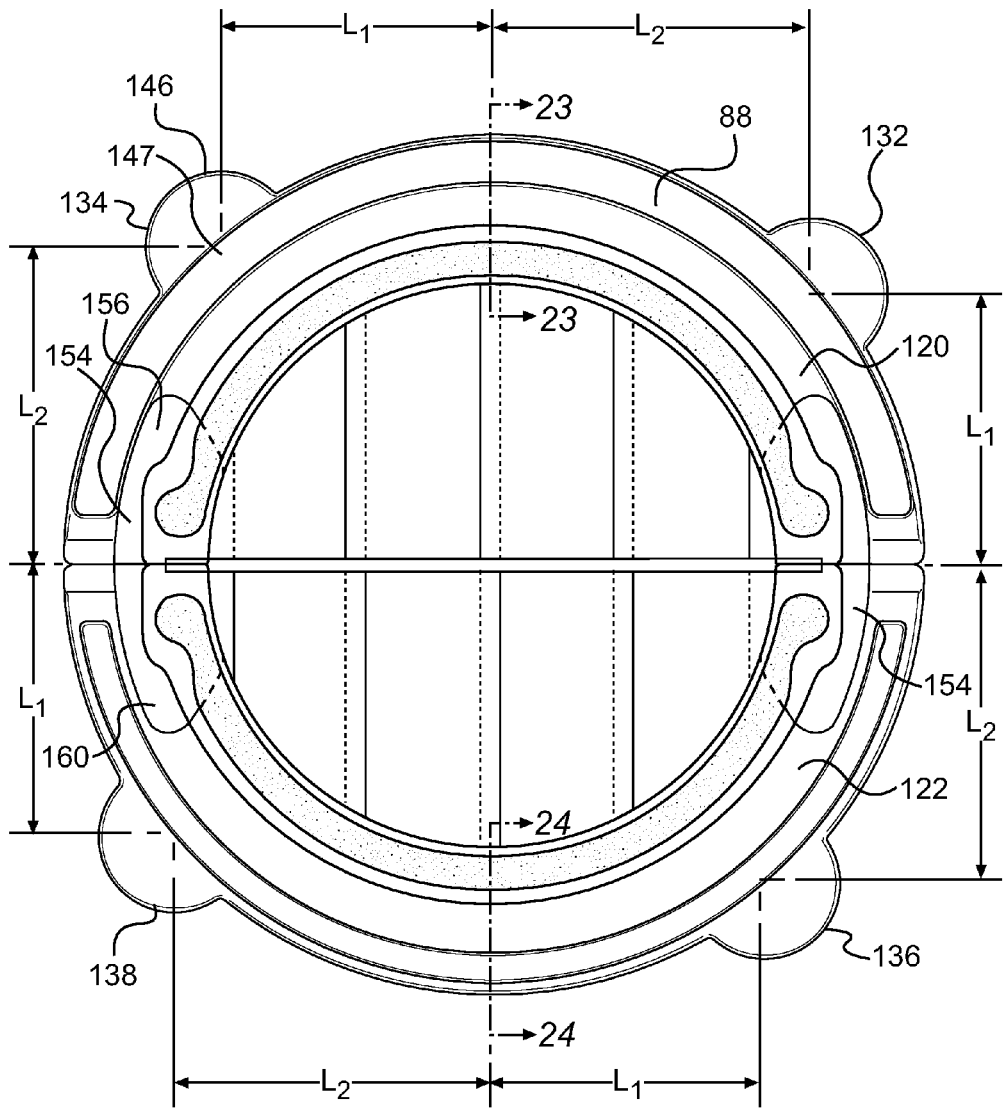
FIG. 22 is a bottom plan view of the diaper pail bag assembly that is shown in FIG. 21.
Figure 25:
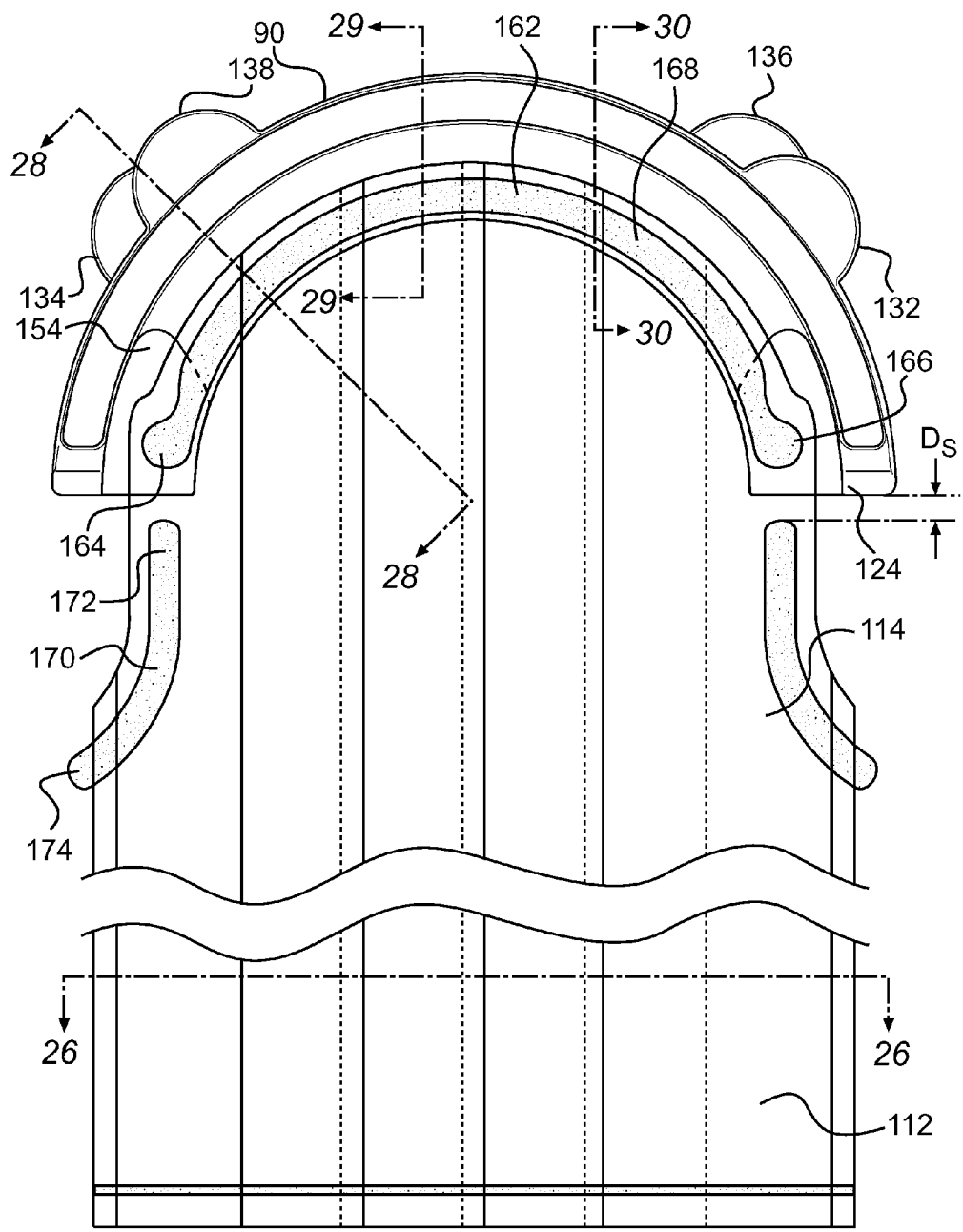
FIG. 25 is a fragmentary depiction of the diaper pail bag assembly shown in FIG. 21 in a closed position.

Bag frame 90 defines an upper surface 121, as is shown in FIG. 21, and a lower surface 88 that is best shown in FIG. 22. Bag frame 90 is preferably constructed so as to be foldable about a hinge portion 124 from the open position that is shown in FIGS. 21 and 22 to the closed position that is shown in FIG. 25. In the closed position that is shown in FIG. 25, the closure of the bag frame 90 effectively closes the upper portion 114 of the flexible bag 112 and prevents odors from escaping from the flexible bag 112.

In addition, the bag frame 90 when in the closed position forms a convenient handle that is shaped and sized for a consumer to conveniently grip in order to carry the flexible bag 112, together with any waste load packages 118 that are stored therein, to a location that is remote from the diaper pail assembly 10 for final disposal of the flexible bag 112 and the waste load packages 118.

Referring back to FIG. 21, the hinge portion 124 is preferably integrally molded into the bag frame 90 and is formed as a linear area that has a reduced cross-sectional thickness, so as to permit folding of the bag frame 90 into the closed position. The bag frame 90 further includes an annular inner surface 126 that defines a central opening 128 that forms the open end of the bag frame assembly 110 when the bag frame 90 is in the open position. The central opening 128 is preferably substantially circular and preferably has a maximum inner lateral dimension or diameter $D_i$ that is substantially within a range of about 60 mm to about 180 mm. More preferably, the inner diameter Di is substantially within a range of about 85 mm to about 150 mm.

Bag frame 90 also preferably is constructed to have an outer circumferential surface 130 that is preferably substantially circular in shape and that defines a minimum outer diameter $D_o$ that is preferably within a range of about 90 mm to about 270 mm, more preferably within a range of about 120 mm to about 250 mm and most preferably within a range of about 140 mm to about 230 mm.

The inner diameter $D_i$ represents a first diameter of the flexible bag 112 at a location proximate the frame 90. The flexible bag 112 at its lower portion 116 further includes a second diameter $D_L$ that is preferably the maximum diameter of the entire flexible bag 112. The second diameter $D_L$ is depicted in FIG. 20, and should properly be measured for purposes of this document with the lower portion 116 of the bag 112 expanded to the maximum extent permitted by the construction of the bag 122 in a shape that is circular in transverse cross-section. Preferably, the second diameter $D_L$ is larger than the first diameter $D_i$.

The second diameter $D_L$ is preferably substantially within a range of about 9 cm to about 40 cm, more preferably substantially within a range of about 13 cm to about 30 cm, and most preferably substantially within a range of about 15 cm to about 25 cm.

A ratio of the first diameter $D_i$ to the second diameter $D_L$ is preferably substantially within a range of about 0.20 to about 0.90, more preferably substantially within a range of about 0.40 to about 0.75, and most preferably substantially within a range of about 0.50 to about 0.70.

The flexible bag assembly 110 further is constructed so as to have a length that is preferably substantially within a range of about 30 cm to about 110 cm, more preferably within a range of about 40 cm to about 100 cm, and most preferably within a range of about 50 cm to about 80 cm.

A plurality of male, radially outwardly extending projections 132, 134, 136, 138 are preferably integrally formed in the bag frame 90 for permitting secure registration of the bag frame 90 with respect to the housing 12 of the diaper pail assembly 10 during use. Referring back briefly to FIG. 16, a plurality of recesses 133 are defined in the housing 12 for receiving the respective projections 132, 134, 136, 138 in such a manner that the bag frame 90 is secured against rotation relative to the housing 12 and is securely oriented and aligned in a horizontal position when the projections 132, 134, 136, 138 are received within the respective recesses 133.

In addition, structure that is embodied as a retaining projection 135 is preferably provided in each of the respective recesses 133 for releasably locking the respective projection 132, 134, 136, 138 within the respective recess 133. The retaining projections 135 are preferably fabricated from a substantially rigid plastic material and are integral with the housing 12 of the diaper pail assembly 10. The inherent flexibility of the material from which the bag frame 90 is fabricated permits the parent or caregiver to manipulate the bag frame 90 into the secured position wherein each of the projections 132, 134, 136, 138 are positioned beneath the respective retaining projections 135. Similarly, the inherent flexibility of the bag frame 90 is utilized when removing the bag frame 90 from the housing 12.

Releasable locking structure 140 is also preferably provided on the bag frame 90 in order to permit the parent or caregiver to releasably lock the bag frame 90 into the closed position that is shown in FIG. 25. In the preferred embodiment, the releasable locking structure 140 includes a curved female recess 142 that is defined in the first portion 120 of the bag frame 90 and a mating curved male projection 144 that is defined in the second portion 122 of the bag frame 90. The curved mating portions 142, 144 advantageously and preferably extend along most of the outer periphery of the respective portions 120, 122 of the bag frame 90 in order to effectively retain odors within the flexible bag assembly 110 when it is in the closed position shown in FIG. 25.

The releasable locking structure 140 accordingly is constructed and arranged to define an effective odor seal as well as a locking mechanism to retain the bag frame 90 in the closed position. The curved mating portions 142, 144 preferably have a substantially constant radius and preferably subtend an angular distance that is preferably substantially within a range of about 90° to about 179°, more preferably within a range of about 120° to about 179° and most preferably within a range of about 150° to about 179°. The larger the angular distance covered by the curved mating portions 142, 144, the more effective odor seal will be created by the releasable locking structure 140.

As is shown in FIG. 22, which is a bottom plan view of the bag frame 90 shown in the open position, the male, radially extending projections 132, 134, 136, 138 are preferably staggered about the outer periphery of the bag frame 90 so that the projection pairs 134, 138 and 132, 136 are adjacent to each other but do not fully overlap when in the closed position shown in FIG. 25. In the preferred embodiment, the projections 132, 134, 136, 138 are spaced so that there is a slight but not full overlap between the corresponding projection pairs 134, 138 and 132, 136. This permits the parent or caregiver to use his or her thumb and forefinger in order to gain leverage against one of the projection pairs 134, 138 or 132, 136 in order to disengage the releasable locking structure 140 and move the bag frame 90 from the closed position into the open position.

As FIG. 22 shows, each of the projections 132, 134, 136, 138 is preferably constructed so as to have an outer surface that is convexly about a radial center locus 147. The radial center locus 147 of the projection 134 is preferably spaced a first distance $L_1$ from a vertical transverse centerline of the bag frame 90 and a second distance $L_2$ from a horizontal transverse centerline as viewed in bottom plan as shown in FIG. 22. The radial center locus 147 of the projection 132 is preferably spaced by the second distance $L_2$ from the vertical transverse centerline and by the first distance $L_1$ from the horizontal centerline. The projection 138 is preferably spaced by the first distance $L_1$ from the horizontal centerline and by the second distance $L_2$ from the vertical centerline, and the projection 136 is preferably spaced by the first distance $L_1$ from the vertical centerline and by the second distance $L_2$ from the horizontal centerline.

Preferably, the first distance $L_1$ is less than the second distance $L_2$. More preferably, the first distance $L_1$ has a ratio with respect to the second distance $L_2$ that is preferably substantially within a range of about 0.60 to about 0.95 and that is more preferably within a range of about 0.75 to about 0.90. In an alternative embodiment, the first distance $L_1$ could be greater than the second distance $L_2$.

Referring now to FIG. 23, it will be seen that the female curved mating portion 142 of the releasable locking structure 140 preferably has a small projection 150 defining an undercut for receiving and retaining the male curved mating portion 144 in the locked position. As FIG. 24 shows, the male curved mating portion 144 also preferably includes a projection 148 for engaging the projection 150 in the female curved mating portion 142. The female and male mating portions 142, 144 are shown in the secured positions in FIGS. 28-30.

The upper portion 114 of the flexible bag 112 has a complex and advantageous construction in order to ensure secure attachment to the lower surface 88 of the bag frame 90. It is preferably die cut in order to correspond to the shape of the bag frame 90.

Referring to FIGS. 22 and 25, it will be seen that a film reinforcement insert 154 is bonded to a portion of the lower surface 88 that includes areas of the first and second portions 120, 122 as well as the hinge portion 124. The film reinforcement insert 154 is preferably fabricated from a film material that is substantially identical in construction to the film material from which the flexible bag 112 is fabricated. It increases the strength of the seal that is formed between the upper portion 114 of the flexible bag in the lower surface 88 of the bag frame 90. It also provides the additional benefit of providing some reinforcement to the hinge portion 124.

Figure 27:
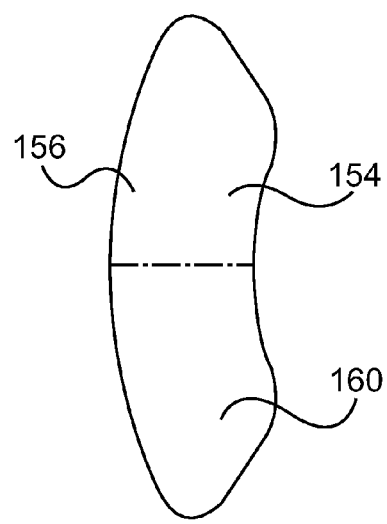
FIG. 27 is an isolation view of one component of the diaper pail bag assembly shown in FIG. 21.

The film reinforcement insert 154 is shown in isolation in FIG. 27 and includes a first portion 156 that is bonded to the first portion 120 of the bag frame 90, as shown in FIG. 22, and a second portion 160 that is bonded to the second portion 122 of the bag frame 90. The film reinforcement insert 154 is preferably tacked or heat sealed to the lower surface 88 using a hot tool such as a hot tip soldering iron prior to the assembly of the upper portion 114 of the flexible bag 112 to the bag frame 90.

The upper portion 114 of the flexible bag 112 further preferably includes a primary seal portion 162 that is bonded, tacked or heat sealed to a semicircular portion of each of the first and second portions 120, 122 of the bag frame 91 on the lower surface 88. The primary seal portion 162 is integral with the upper portion 114 and includes a first end 164, an opposite second end 166 and a curved central portion 168. The first and second ends 164, 166 preferably respectively have broadened end portions that in the preferred embodiment are substantially circular. The first and second ends 164, 166 are bonded by heat sealing to the respective film reinforcement inserts 154, which enhances the strength of the ultimate bond between the first and second ends 164, 166 and the underside 88 of the bag frame 90.

Figure 26:
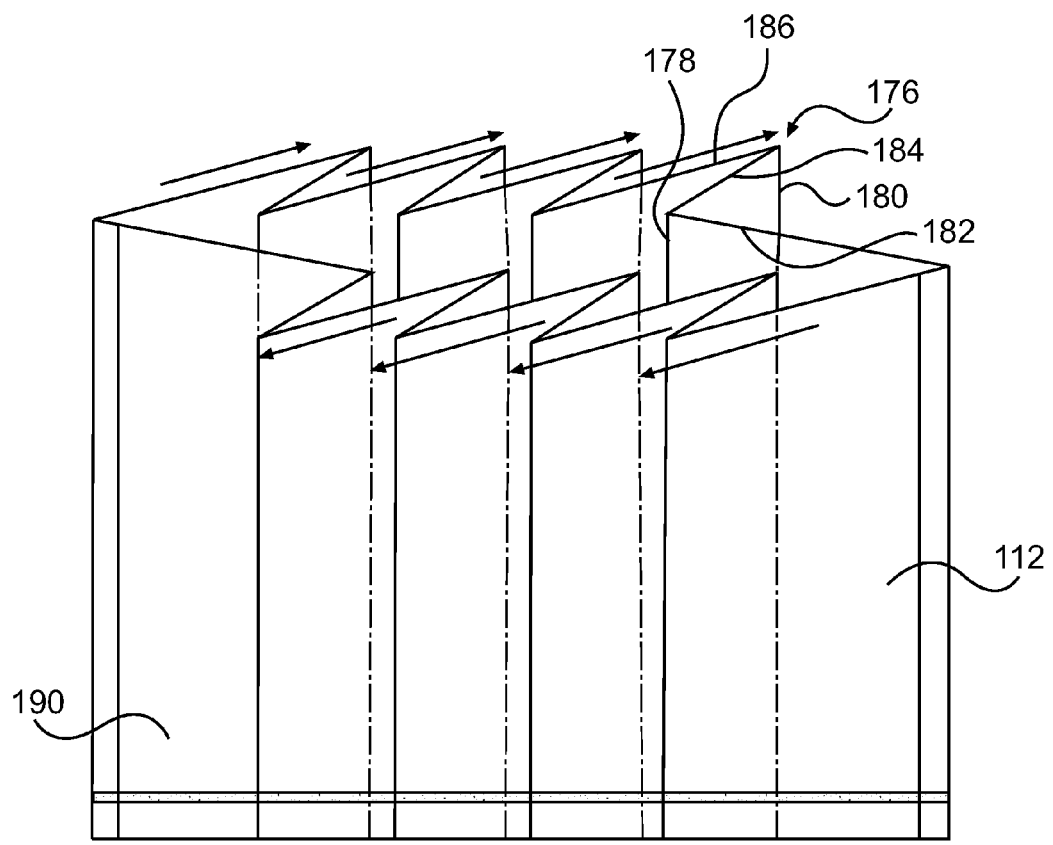
FIG. 26 is a diagrammatical cross-sectional view taken along lines 26-26 in FIG. 25.

Referring briefly to FIG. 26, which is a diagrammatical cross-sectional view taken along lines 26-26 in FIG. 25, the upper portion 114 of the flexible bag 112 is advantageously pleated in order to permit significant expandability of the lower portion 116 of the flexible bag 112 with respect to the upper portion 114. The pleating is constructed and arranged in such a manner in the preferred embodiment that each pleat 176 includes three plies 182, 184, 186 of the film material 190 from which the flexible bag 112 is fabricated, with a first fold 178 being defined between the first and second plies 182, 184 and a second fold 180 being defined between the second and third plies 184, 186. Each of the pleats 176 is preferably substantially parallel to adjacent pleats and is preferably oriented so as to extend parallel to a longitudinal axis of the flexible bag assembly 110 that is substantially perpendicular to the transverse plane in which the bag frame 90 is positioned during use.

The flexible bag 112 preferably includes at least two pleats 176 around the outer periphery, more preferably at least four pleats 176 and most preferably at least six pleats 176. In the illustrated embodiment, the flexible bag 112 has eight pleats 176.

FIG. 28 is an exploded cross-sectional view taken along lines 28-28 in FIG. 25. The primary seal 162 is constructed and arranged so that all three plies of the upper portion 114 are bonded to each other, with the inwardmost ply 182 being directly bonded to the lower surface 88 of the bag frame 90. This is also shown in FIG. 29, which is an exploded cross-sectional view taken along lines 29-29 and FIG. 25. FIG. 30 is an exploded cross-sectional view taken along lines 30-30 in FIG. 25, showing a portion of the primary seal 162 at a portion of the upper flexible bag portion 114 between adjacent pleats 176. In this location, which is between adjacent pleats 176, only a single layer of the film material 190 overlies the lower surface 88 of the bag frame 90.

As is best shown in FIG. 25, a bag assembly 110 according to the preferred embodiment also preferably and advantageously includes a plurality of secondary seals 170 that are formed in the upper portion 114 of the flexible bag 112 in an area that is closely adjacent to the bag frame 90. The flexible bag 112 is preferably fabricated by welding two sheets of the film material 190 together. One of the sheets forms the portion of the flexible bag 112 that is bonded to the first portion 120 of the bag frame 90, while the other of the sheets forms a portion of the flexible bag 112 that is bonded to the second portion 122 of the bag frame 90.

Each secondary seal includes a first end 172 and a second end 174, and is formed by creating a supplemental heat seal or weld of the two sheets of the film material 190 together slightly beneath the bag frame 190, as is shown in FIG. 25. The first end 172 of the secondary seal 170 is preferably separated from the bag frame 90 by a small distance $D_s$ that is preferably substantially within a range of about 1 mm to about 12 mm, more preferably within a range of about 3 mm to about 9 mm and most preferably within a range of about 4 mm to about 7 mm.

The film material 190 preferably is fabricated from a material that substantially prevents transmission of odors therethrough and that is substantially liquid impervious. A preferred embodiment of the film material 190 is diagrammatically shown in FIG. 31 and includes a first outer layer 192 that defines the outer surface of the flexible bag 112, a second layer 194, a third layer 196, a fourth layer 198, a fifth layer 200, a sixth layer 202, and a seventh, inner layer 204 that defines the inner surface of the flexible bag 112.

The film material 190 preferably has a total thickness that is preferably substantially within a range of about 15 μm to about 45 μm, and more preferably substantially within a range of about 20 μm to about 40 μm.

The first and seventh external layers 192, 204 are fabricated to ensure durability and their ability to be heat sealed together and to the bag frame 90. In addition, these layers are preferably fabricated using a slip agent in order to ensure that the coefficients of friction are within the predetermined ranges described above. The slip agent, which is preferably cis-13-Docosenoamide, CAS NO.: 112-84-5, decreases the engagement between the film material 190 and the bag-engaging surfaces of the finger members 94 both when the lower portion 116 is pushed downwardly by the user through the finger members 94, and when the intermediate portion 113 of the bag member 112 is engaged and twisted by the finger members 94.

The first and seventh external layers 192, 204 each both preferably have a thickness that is substantially within a range of about 2.75 µm to about 6.75 µm, and more preferably substantially within a range of about 3.75 µm to about 5.75 µm. The most preferable dimensions are shown in Table 1.

An anti-block agent is also preferably provided in the external layers 192, 204 in order to prevent the film material from sticking together. In the preferred embodiment a zeolite, preferably CAS NO: 1318-02-1, is used.

The second and six layers 194, 202 are fabricated to ensure durability and preferably include a pigmentation agent in order to provide a desired coloration. A slip agent is also preferably included in these layers 194, 202, which is preferably cis-13-Docosenoamide, CAS NO.: 112-84-5.

The second and six layers 194, 202 each both preferably have a thickness that is substantially within a range of about 3.25 µm to about 7.25 µm, and more preferably substantially within a range of about 4.25 µm to about 6.25 µm. The most preferable dimensions are shown in Table 1.

Alternatively, the second and sixth layers 194, 202 could be integrated into the first and seventh outer layers 192, 204 in order to create a five layered material. In this case, the thickness of each combined layer would preferably be substantially within a range of about 8.0 µm to about 12.0 µm, and more preferably substantially within a range of about 9.0 µm to about 11.0 µm.

The third and fifth layers 196, 200 are tie layers having the function of binding the respective adjacent layers together. Preferably, an anhydride-modified linear low-density polyethylene (LLDPE) adhesive resin is used, such as Dupont 41E687. The third and fifth layers 196, 200 each both preferably have a thickness that is substantially within a range of about 1.75 µm to about 5.75 µm, and more preferably substantially within a range of about 2.75 µm to about 4.75 µm. The most preferable dimensions are shown in Table 1.

The fourth, middle layer 198 is a barrier layer that ensures that the film material 190 is substantially impervious to liquids and odor transmission. It preferably has a thickness that is substantially within a range of about 0.50 µm to about 4.50 µm, and more preferably substantially within a range of about 1.50 µm to about 3.50 µm. The most preferable dimensions are shown in Table 1.

The respective layers most preferably have a construction and a thickness as described in the following table:

TABLE 1

| | Base Material | Thickness (um/inch/% of total) |
|---|---|---|
| 1st layer (Outer layer) | 66.0% mLLDPE + 30.0% LDPE + 3.8% slip agent + 0.2% anti-block agent by weight mLLDPE is preferably ExxonMobil 1018FA LDPE is preferably ExxonMobil LD100 series Slip agent is preferably cis-13-Docosenoamide, CAS NO.: 112-84-5 Anti-block agent is preferably Zeolite, CAS NO: 1318-02-1 | 4.75 um/0.00019"/15.8% |
| 2nd layer | 66.3% mLLDPE + 28.5% LDPE + 3.8% slip agent + 1.4% colorant by wt mLLDPE is preferably ExxonMobil 1018FA LDPE is preferably ExxonMobil LD100 series Slip agent is preferably cis-13-Docosenoamide, CAS NO.: 112-84-5 Colorant is preferably SPEM-5M1629 | 5.25 um/0.00021"/17.5% |
| 3rd layer | Tie layer Preferably a anhydride-modified linear low-density polyethylene (LLDPE) adhesive resin, most preferably Dupont 41E687 | 3.75 um/0.00015"/12.5% |
| 4th layer | Barrier layer. Preferably EVOH, most preferably Nippon Gohsei ET3803 | 2.5 um/0.0001"/8.4% |
| 5th layer | Tie layer Preferably a anhydride-modified linear low-density polyethylene (LLDPE) adhesive resin, most preferably Dupont 41E687 | 3.75 um/0.00015"/12.5% |
| 6th layer | 66.3% mLLDPE + 28.5% LDPE + 3.8% slip agent + 1.4% colorant by wt mLLDPE is preferably ExxonMobil 1018FA LDPE is preferably ExxonMobil LD100 series Slip agent is preferably cis-13-Docosenoamide, CAS NO.: 112-84-5 Colorant is preferably SPEM-5M1629 | 5.25 um/0.00021"/17.5% |
| 7th layer (Inner layer) | 66.0% mLLDPE + 30.0% LDPE + 3.8% slip agent + 0.2% anti-block agent by weight mLLDPE is preferably ExxonMobil 1018FA LDPE is preferably ExxonMobil LD100 series Slip agent is preferably cis-13-Docosenoamide, CAS NO.: 112-84-5 Anti-block agent is preferably Zeolite, CAS NO: 1318-02-1 | 4.75 um/0.00019"/15.8% |

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A diaper pail assembly, comprising:
   a housing;
   a bag having a bag frame, said bag frame being releasably mounted to said housing so as not to rotate with respect to said housing; and
   a rotatable member for twisting a portion of said bag, wherein said rotatable member comprises a support member for supporting said bag frame;
   wherein said support member comprises an upstanding projection, said upstanding projection having an upper surface that is constructed and arranged to minimize friction between said upstanding projection and said bag frame.

2. A diaper pail assembly according to claim 1, further comprising a bottom surface for supporting the bag, wherein said bottom surface comprises a curved concave portion for aligning and centering the bag.

3. A diaper pail assembly according to claim 2, wherein said curved concave portion has a radius of curvature that is substantially constant.

4. A diaper pail assembly according to claim 2, wherein said bottom portion further comprises a substantially flat central portion.

5. A diaper pail assembly according to claim 1, wherein said upper surface comprises a convexly curved surface.

6. A diaper pail assembly according to claim 1, wherein said upper surface is fabricated from a material having a kinetic frictional coefficient that is substantially within a range of about 0.30 to about 0.50.

7. A diaper pail assembly according to claim 6, wherein said upper surface is fabricated from a material having a kinetic frictional coefficient that is substantially within a range of about 0.35 to about 0.45.

8. A diaper pail assembly according to claim 1, wherein said bag frame is fabricated from a plastic material.

9. A diaper pail assembly according to claim 8, wherein said plastic material comprises polyethylene.

10. A diaper pail assembly according to claim 1, wherein said rotatable member has a bag engaging surface, and wherein a relative kinetic coefficient of friction between the bag engaging surface and an external surface of the bag that is substantially within a range of about 0.34 to about 0.64.

11. A diaper pail assembly according to claim 1, wherein said rotatable member has a bag engaging surface, and wherein a relative kinetic coefficient of friction between the bag engaging surface and an external surface of the bag that is substantially within a range of about 0.39 to about 0.59.

12. A diaper pail assembly, comprising:
a housing;
a lid mounted to said housing;
a bag;
a rotatable member for effecting twisting of said flexible bag; and
a transmission mechanism for rotating said rotating member when said lid is closed, and wherein said transmission member includes a clutch mechanism that is constructed and arranged to disengage when a predetermined amount of force within said transmission mechanism is exceeded.

13. A diaper pail assembly according to claim 12, wherein said bag is mounted to a bag frame that is secured against rotation with respect to said housing.

* * * * *